United States Patent
Das et al.

(10) Patent No.: US 8,427,975 B2
(45) Date of Patent: Apr. 23, 2013

(54) OUT-OF BAND RADIO FOR SUPPORTING COMPRESSED MODE IN A FEMTO DEPLOYMENT

(75) Inventors: Soumya Das, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 12/983,576

(22) Filed: Jan. 3, 2011

(65) Prior Publication Data

US 2012/0170473 A1 Jul. 5, 2012

(51) Int. Cl.
*G01R 31/08* (2006.01)
*G06F 11/00* (2006.01)
*G08B 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................................... 370/252

(58) Field of Classification Search ........................ None
See application file for complete search history.

(56) References Cited

U.S. PATENT DOCUMENTS

| 2004/0014474 A1* | 1/2004 | Kanada ........................ 455/444 |
| 2004/0152458 A1* | 8/2004 | Hottinen ...................... 455/423 |
| 2005/0277416 A1 | 12/2005 | Tolli et al. |
| 2008/0159182 A1* | 7/2008 | Tu et al. ......................... 370/278 |
| 2009/0258672 A1 | 10/2009 | Camp, Jr. et al. |
| 2010/0061343 A1 | 3/2010 | Kazmi et al. |
| 2010/0069065 A1 | 3/2010 | Sambhwani et al. |
| 2010/0128825 A1* | 5/2010 | Lindoff et al. ................ 375/344 |

OTHER PUBLICATIONS

International Search Report and Written Opinion—PCT/US2011/065244—ISA/EPO—Mar. 9, 2012.

* cited by examiner

*Primary Examiner* — Chirag Shah
*Assistant Examiner* — Rina Pancholi
(74) *Attorney, Agent, or Firm* — Jeffrey D. Jacobs

(57) ABSTRACT

Systems, methods, devices, and computer program products are described for using communications over an out-of-band (OOB) link to support compressed mode communications by user equipment (UE) in a femto deployment. Typically, UEs must tune away from an active communications channel to make inter-frequency and/or inter-RAT measurements. When making these measurements, data communications may be compressed to allow time to tune away for those measurements. Embodiments integrate an OOB proxy with the femtocell to provide OOB link capability to supplement WWAN link resources. According to various techniques, the OOB link is used to compensate for reductions in data rate and/or quality resulting from compressed mode operation. For example, the OOB link is used to communicate compressed mode signaling data, retransmissions, and/or other compensatory data.

49 Claims, 14 Drawing Sheets

US 8,427,975 B2

OUT-OF BAND RADIO FOR SUPPORTING COMPRESSED MODE IN A FEMTO DEPLOYMENT

BACKGROUND

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (referred to herein as user equipment (UE)), such as cellular phones, PDAs, laptop computers, etc. are mobile and thus may connect with a network through a number of different interfaces.

Mobile client devices may connect with a network wirelessly via a base station, access point, wireless router, etc. (collectively referred to herein as access points). A mobile client device may remain within the service area of such an access point for a relatively long period of time (referred to as being "camped on" the access point) or may travel relatively rapidly through access point service areas, with cellular handoff or reselection techniques being used for maintaining a communication session or for idle mode operation as association with access points is changed.

Issues with respect to available spectrum, bandwidth, capacity, etc. may result in a network interface being unavailable or inadequate between a particular client device and access point. Moreover, issues with respect to wireless signal propagation, such as shadowing, multipath fading, interference, etc. may result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

SUMMARY

The present disclosure is directed to systems and methods for using communications over an out-of-band (OOB) link to support compressed mode communications by user equipment (UE) in a femto deployment. Typically, UEs must tune away from an active communications channel to make inter-frequency and/or inter-RAT measurements. When making these measurements, data communications may be compressed to allow time to tune away for those measurements. Embodiments integrate an OOB proxy with the femtocell to provide OOB link capability to supplement WWAN link resources. According to various techniques, the OOB link is used to compensate for reductions in data rate and/or quality resulting from compressed mode operation. For example, the OOB link is used to communicate compressed mode signaling data, retransmissions, and/or other compensatory data.

An exemplary method includes: detecting a measurement trigger condition with user equipment while the user equipment is communicating with a femtocell over a wireless wide area network (WWAN) link on a first WWAN channel according to a first communications mode at a data rate in satisfaction of a rate target and at a data quality in satisfaction of a quality target; and switching the user equipment to communicate according to a second communications mode in response to detecting the measurement trigger. Communicating according to the second communications mode includes: interspersing measurement blocks with data frames, such that the user equipment communicates with the femtocell over the WWAN link on the first WWAN channel during the data frames and performs measurements on at least a second WWAN channel during the measurement blocks; compressing communications with the femtocell over the WWAN link on the first WWAN channel by reducing at least one of the data rate or the data quality; and communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

According to certain configurations, the femtocell and the OOB femto-proxy are integrated with each other as part of a femto-proxy system. Additionally or alternatively, the second WWAN channel is an inter-frequency neighbor or an inter-RAT (radio access technology) neighbor of the first WWAN channel. Additionally or alternatively, the OOB link is a Bluetooth link.

According to some such methods, communicating according to the second communications mode further includes generating signaling data configured to facilitate communications by the user equipment according to the second mode; and communicating the supplemental data between the user equipment and the OOB femto-proxy over the OOB link includes communicating at least some of the signaling data over the OOB link.

According to other such methods, the user equipment communicates data with the femtocell over the WWAN link on the first WWAN channel, the data having a payload portion and a redundancy portion configured to satisfy the quality target; compressing communications with the femtocell over the WWAN link on the first WWAN channel includes reducing the data quality by reducing the redundancy portion of the data; and communicating the supplemental data between the user equipment and the OOB femto-proxy over the OOB link includes communicating retransmissions over the OOB link to at least partially compensate for the reducing of the data quality (e.g., without substantially increasing instantaneous transmit power associated with the WWAN link).

According to still other such methods, communicating according to the second communications mode further includes generating signaling data configured to facilitate communications by the user equipment according to the second mode; and communicating the supplemental data between the user equipment and the OOB femto-proxy over the OOB link further includes communicating at least some of the signaling data over the OOB link. According to even other such methods, communicating according to the first communications mode includes communicating data with the femtocell over the WWAN link on the first WWAN channel during the data frames, each data frame having a first duration; and communicating according to the second communications mode includes communicating data with the femtocell over the WWAN link on the first WWAN channel during the data frames, each data frame having a second duration that is shorter than the first duration.

According to yet other such methods, compressing communications with the femtocell over the WWAN link on the first WWAN channel includes reducing the data rate by communicating data with the femtocell only during the data frames and without substantially changing the data quality, such that only a first portion of the data can be communicated over the WWAN link; and communicating the supplemental data between the user equipment and the OOB femto-proxy over the OOB link includes communicating a remaining portion of the data over the OOB link to at least partially compensate for the reducing of the data rate. Additionally or alternatively, the remaining portion of the data is communicated over the OOB link only during the measurement blocks. Additionally or alternatively, communicating according to the second communications mode further includes generating signaling data configured to facilitate communications by the user equipment according to the second mode; and communicating the supplemental data between the user equipment and the OOB femto-proxy over the OOB link further includes communicating at least some of the signaling data over the OOB link.

An exemplary user equipment includes: an in-band communications subsystem configured to communicatively couple with a femtocell over a wireless wide area network (WWAN) link on a first WWAN channel and to communicate with at least one macrocell over the WWAN link on a second WWAN channel; an out-of-band (OOB) communications subsystem configured to communicatively couple with an OOB femto-proxy over an OOB link; and a communications management subsystem, communicatively coupled with the in-band communications subsystem and the OOB communications subsystem, and configured to: detect a measurement trigger condition while communicating with the femtocell over the WWAN link on the first WWAN channel according to a first communications mode at a data rate in satisfaction of a rate target and at a data quality in satisfaction of a quality target; and direct the in-band communications subsystem and the OOB communications subsystem to communicate according to a second communications mode in response to detecting the measurement trigger. Communicating according to the second communications mode includes: interspersing measurement blocks with data frames, such that communications with the femtocell over the WWAN link on the first WWAN channel occur during the data frames and measurements are performed on at least the second WWAN channel during the measurement blocks; compressing communications with the femtocell over the WWAN link on the first WWAN channel by reducing at least one of the data rate or the data quality; and communicating supplemental data with the OOB femto-proxy over the OOB link substantially concurrently with communicating with the femtocell over the WWAN link, such that communicating the supplemental data at least partially compensates for the reducing at least one of the data rate or the data quality.

An exemplary processor includes: an in-band communications controller configured to communicatively couple with a femtocell over a wireless wide area network (WWAN) link on a first WWAN channel and to communicate with at least one macrocell over the WWAN link on a second WWAN channel; an out-of-band (OOB) communications controller configured to communicatively couple with an OOB femto-proxy over an OOB link; and
a communications management controller, communicatively coupled with the in-band communications subsystem and the OOB communications subsystem, and configured to: detect a measurement trigger condition while communicating with the femtocell over the WWAN link on the first WWAN channel according to a first communications mode at a data rate in satisfaction of a rate target and at a data quality in satisfaction of a quality target; and direct the in-band communications controller and the OOB communications controller to communicate according to a second communications mode in response to detecting the measurement trigger. Communicating according to the second communications mode includes: interspersing measurement blocks with data frames, such that communications with the femtocell over the WWAN link on the first WWAN channel occur during the data frames and measurements are performed on at least the second WWAN channel during the measurement blocks; compressing communications with the femtocell over the WWAN link on the first WWAN channel by reducing at least one of the data rate or the data quality; and communicating supplemental data with the OOB femto-proxy over the OOB link substantially concurrently with communicating with the femtocell over the WWAN link, such that communicating the supplemental data at least partially compensates for the reducing at least one of the data rate or the data quality.

An exemplary computer program product residing on a processor-readable medium has processor-readable instructions, which, when executed, cause a processor to perform steps including: detecting a measurement trigger condition with user equipment while the user equipment is communicating with a femtocell over a wireless wide area network (WWAN) link on a first WWAN channel according to a first communications mode at a data rate in satisfaction of a rate target and at a data quality in satisfaction of a quality target; and switching the user equipment to communicate according to a second communications mode in response to detecting the measurement trigger. Communicating according to the second communications mode includes: interspersing measurement blocks with data frames, such that the user equipment communicates with the femtocell over the WWAN link on the first WWAN channel during the data frames and performs measurements on at least a second WWAN channel during the measurement blocks; compressing communications with the femtocell over the WWAN link on the first WWAN channel by reducing at least one of the data rate or the data quality; and communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

Another exemplary system includes: means for communicating with a femtocell over a wireless wide area network (WWAN) link on a first WWAN channel according to a first communications mode at a data rate in satisfaction of a rate target and at a data quality in satisfaction of a quality target; means for detecting a measurement trigger condition while the means for communicating is communicating according to the first communications mode; and means for directing the means for communicating to communicate according to a second communications mode in response to detecting the measurement trigger. Communicating according to the second communications mode includes: interspersing measurement blocks with data frames, such that the user equipment communicates with the femtocell over the WWAN link on the first WWAN channel during the data frames and performs measurements on at least a second WWAN channel during the measurement blocks; compressing communications with the femtocell over the WWAN link on the first WWAN channel by reducing at least one of the data rate or the data quality; and communicating supplemental data with an out-of-band (OOB) femto-proxy over an OOB link substantially concurrently with communicating with the femtocell over the WWAN link, such that communicating the supplemental data at least partially compensates for the reducing at least one of the data rate or the data quality.

An exemplary femto-proxy system includes: a femtocell, configured to provide macro network access to a number of user equipment authorized to attach to the femtocell according to an access control list over a wireless wide area network (WWAN) link on a first WWAN channel; an out-of-band (OOB) communications subsystem, integrated with the femtocell and configured to communicatively couple with the number of user equipment over an OOB link; and a communications management subsystem, communicatively coupled with the femtocell and the OOB communications subsystem, and configured to: detect a measurement trigger condition for one of the user equipment that is in communication with the femtocell over the WWAN link on the first WWAN channel according to a first communications mode at a data rate in satisfaction of a rate target and at a data quality in satisfaction of a quality target; and direct the one of the user equipment to communicate according to a second communications mode in response to detecting the measurement trigger. Communicating according to the second communications mode includes: interspersing measurement blocks with data frames, such that communications with the femtocell over the WWAN link on the first WWAN channel occur during the data frames and measurements are performed on at least the second WWAN channel during the measurement blocks; compressing communications with the femtocell over the WWAN link on the first WWAN channel by reducing at least one of the data rate or the data quality; and communicating supplemental data with the OOB communications subsystem over the OOB link substantially concurrently with communicating with the femtocell over the WWAN link, such that communicating the supplemental data at least partially compensates for the reducing at least one of the data rate or the data quality.

Another exemplary processor includes: a femtocell controller, configured to direct a femtocell to provide macro network access to a number of user equipment authorized to attach to the femtocell according to an access control list over a wireless wide area network (WWAN) link on a first WWAN channel; an out-of-band (OOB) communications controller, configured to direct an OOB radio integrated with the femtocell to communicatively couple with the number of user equipment over an OOB link; and a communications management controller, communicatively coupled with the femtocell controller and the OOB communications controller, and configured to: detect a measurement trigger condition for one of the user equipment that is in communication with the femtocell over the WWAN link on the first WWAN channel according to a first communications mode at a data rate in satisfaction of a rate target and at a data quality in satisfaction of a quality target; and direct the one of the user equipment to communicate according to a second communications mode in response to detecting the measurement trigger. Communicating according to the second communications mode includes: interspersing measurement blocks with data frames, such that communications with the femtocell over the WWAN link on the first WWAN channel occur during the data frames and measurements are performed on at least the second WWAN channel during the measurement blocks; compressing communications with the femtocell over the WWAN link on the first WWAN channel by reducing at least one of the data rate or the data quality; and communicating supplemental data with the OOB radio over the OOB link substantially concurrently with communicating with the femtocell over the WWAN link, such that communicating the supplemental data at least partially compensates for the reducing at least one of the data rate or the data quality.

Another computer program product residing on a processor-readable medium has processor-readable instructions, which, when executed, cause a processor to perform steps including: detecting a measurement trigger condition corresponding to a user equipment while the user equipment is communicating with a femtocell over a wireless wide area network (WWAN) link on a first WWAN channel according to a first communications mode at a data rate in satisfaction of a rate target and at a data quality in satisfaction of a quality target; and directing the user equipment to communicate according to a second communications mode in response to detecting the measurement trigger. Communicating according to the second communications mode includes: interspersing measurement blocks with data frames, such that the user equipment communicates with the femtocell over the WWAN link on the first WWAN channel during the data frames and performs measurements on at least a second WWAN channel during the measurement blocks; compressing communications with the femtocell over the WWAN link on the first WWAN channel by reducing at least one of the data rate or the data quality; and communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

Another exemplary system includes: means for detecting a measurement trigger condition corresponding to a user equipment while the user equipment is communicating with a femtocell over a wireless wide area network (WWAN) link on a first WWAN channel according to a first communications mode at a data rate in satisfaction of a rate target and at a data quality in satisfaction of a quality target; and means for directing the user equipment to communicate according to a second communications mode in response to detecting the measurement trigger, communicating according to the second communications mode including: interspersing measurement blocks with data frames, such that the user equipment communicates with the femtocell over the WWAN link on the first WWAN channel during the data frames and performs measurements on at least a second WWAN channel during the measurement blocks; compressing communications with the femtocell over the WWAN link on the first WWAN channel by reducing at least one of the data rate or the data quality; and communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

The foregoing has outlined rather broadly the features and technical advantages of examples according to disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
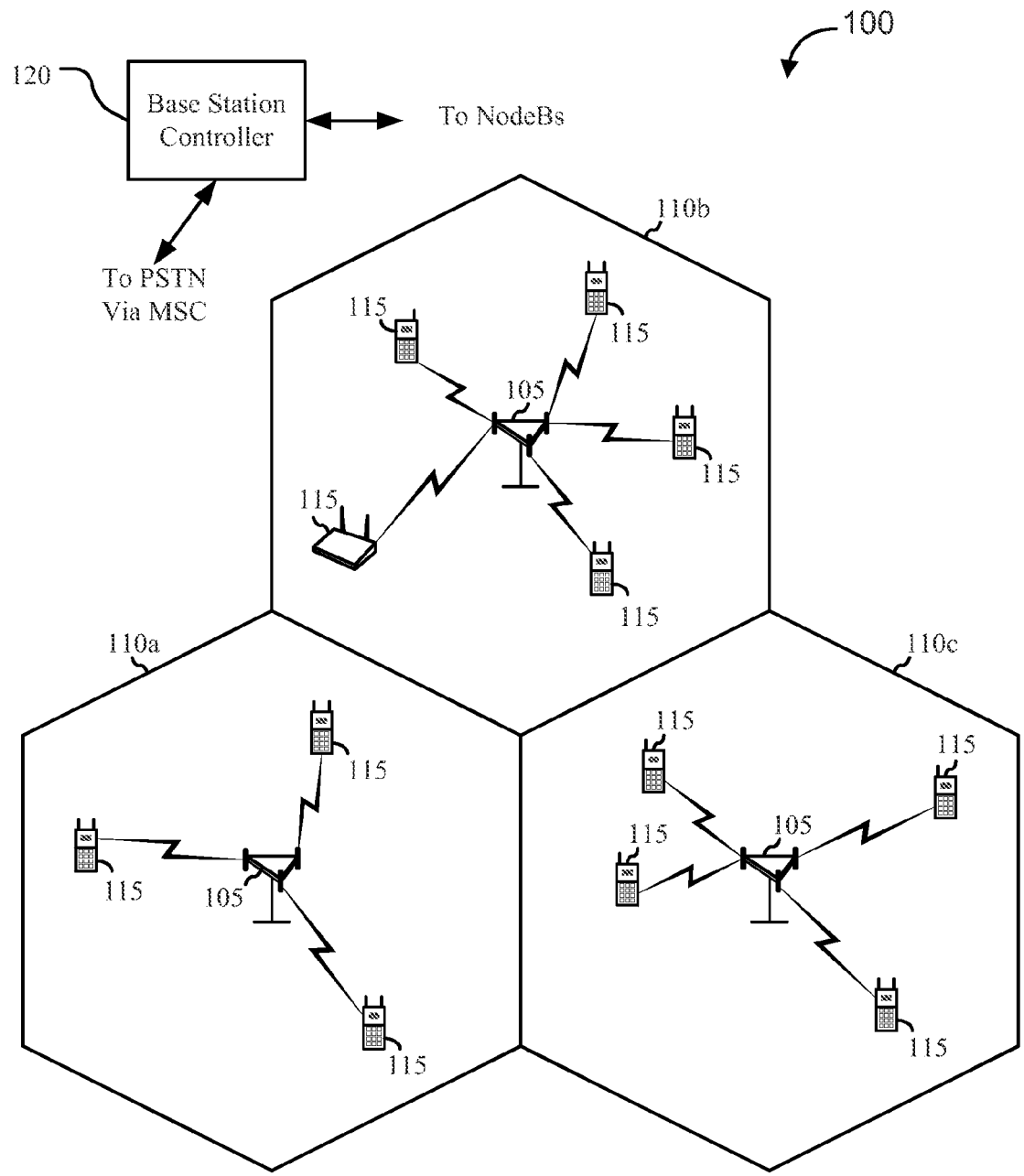
FIG. 1 shows a block diagram of a wireless communications system.

The present disclosure is directed to systems and methods for using an out-of-band (OOB) link to facilitate one or more compressed modes of operation of user equipment (UE) in a femto deployment. To make certain measurements (e.g., inter-frequency, inter-RAT, etc.), a UE typically tunes away from its current frequency during measurement blocks, which may reduce resources available for data (i.e., non-measurement-related) communications. While various techniques are available for compressing data communications, various factors limit the ability of those techniques to preserve desired data rates and/or data fidelities during compressed mode operation of the UE.

Accordingly, a femto-proxy system is provided including a femtocell and an out-of-band (OOB) proxy. The OOB proxy is used to establish an OOB link with the UE which is used in one or more ways to compensate for impacts of compressed mode operations on data rate and/or data fidelity by concurrently communicating one or more types of supplemental data over the OOB link. In some embodiments, data blocks are compressed (e.g., by reducing redundancy communicated with each data block), and the OOB link is used to communicate retransmissions and/or other similar types of data. This may allow compression of data blocks without increasing instantaneous transmit power, while substantially maintaining data fidelity. In other embodiments, data blocks are not compressed, data is not communicated over the in-band link during measurement blocks, and the not communicated during the measurement blocks is communicated instead using the OOB link. In still other embodiments, the OOB link is used to communicate various types of signaling data to support compressed mode operations of the UE without using in-band bandwidth for that data. Yet other embodiments include combinations of multiple of those techniques.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned above, as well as for other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various operations may be added, omitted, or combined. Also, features described with respect to certain examples may be combined in other examples.

Referring first to FIG. 1, a block diagram illustrates an example of a wireless communications system 100. The system 100 includes transceiver stations (referred to herein as NodeBs 105), disposed in cells 110, mobile user equipment 115 (UE), and a base station controller (BSC) 120. It is worth noting that, while the term user equipment (UE) typically denotes UNIVERSAL MOBILE TELECOMMUNICATIONS SYSTEM (UMTS) networks, similar functionality may be deployed in other types of networks via their corresponding network elements (e.g., mobile stations (MSs), access terminals (ATs), etc.) without departing from the scope of the disclosure or the claims.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, redundancy information, data, etc. The system 100 may be a multi-carrier LTE network capable of efficiently allocating network resources.

The NodeBs 105 can wirelessly communicate with the UEs 115 via a base station antenna. The NodeBs 105 are configured to communicate with the UEs 115 under the control of the BSC 120 via multiple carriers. Each of the NodeBs 105 can provide communication coverage for a respective geographic area, here the cell 110-a, 110-b, or 110-c. The system 100 may include NodeBs 105 of different types, e.g., macro, pico, and/or femto base stations.

The UEs 115 can be dispersed throughout the cells 110. The UEs 115 may be referred to as mobile stations, mobile devices, or subscriber units. The UEs 115 here include cellular phones and a wireless communication device, but can also include personal digital assistants (PDAs), other handheld devices, netbooks, notebook computers, etc.

For the discussion below, the UEs 115 operate on (are "camped" on) a macro or similar network facilitated by multiple "macro" NodeBs 105. Each macro NodeB 105 may cover a relatively large geographic area (e.g., several kilometers in radius) and may allow unrestricted access by terminals with service subscription. The UEs 115 are also registered to operate on at least one femto network facilitated by a "femto" or "home" NodeB 105 (as described below). It will be appreciated that, while the macro NodeBs 105 may typically be deployed according to network planning (e.g., resulting in the illustrative hexagonal cells 110 shown in FIG. 1), a femto NodeB 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

The UE 115 may generally operate using an internal power supply, such as a small battery, to facilitate highly mobile operations. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femtocell is implemented as a femto NodeB, referred to herein as a Home Node B (HNB), located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of UEs 115 are registered for (e.g., on a whitelist of) a single HNB that provides coverage over substantially an entire user premises. The HNB provides the UEs 115 with access to communication services over the macro network. As used herein, the macro network is assumed to be a wireless wide-area network (WWAN). As such, terms terms like "macro network" and "WWAN network" are interchangeable. Similar techniques may be applied to other types of network environments without departing from the scope of the disclosure or claims.

In example configurations, the HNB is integrated with one or more out-of-band (OOB) proxies as a femto-proxy system. As used herein, "out-of-band," or "OOB," includes any type of communications that are out of band with respect to the WWAN link. For example, the OOB proxies and/or the UEs 115 may be configured to operate using Bluetooth (e.g., class 1, class 1.5, and/or class 2), ZigBee (e.g., according to the IEEE 802.15.4-2003 wireless standard), WiFi, and/or any other useful type of communications out of the macro network band. Notably, OOB integration with the HNB may provide a number of features, including, for example, reduced interference, lower power femto discovery, etc.

Further, the integration of OOB functionality with the HNB may allow the UEs 115 attached to the HNB to also be part of an OOB piconet. The piconet may facilitate enhanced HNB functionality, other communications services, power management functionality, and/or other features to the UEs 115. These and other features will be further appreciated from the description below.

Figure 2A:
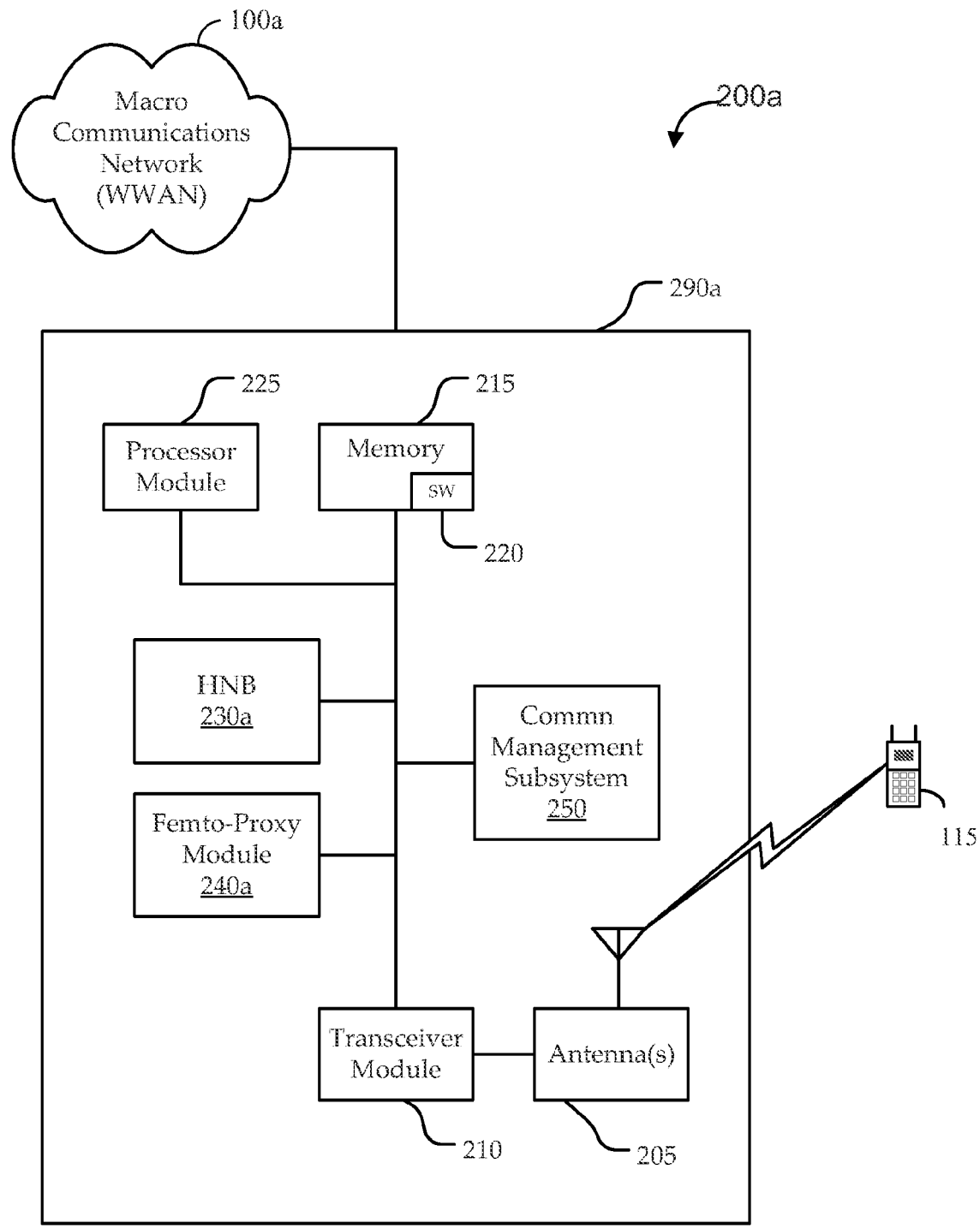
FIG. 2A shows a block diagram of an exemplary wireless communications system that includes a femto-proxy system.

FIG. 2A shows a block diagram of a wireless communications system 200a that includes a femto-proxy system 290a. The femto-proxy system 290a includes a femto-proxy module 240a, a HNB 230a, and a communications management subsystem 250. The HNB 230a may be a femto NodeB 105, as described with reference to FIG. 1. The femto-proxy system 290a also includes antennas 205, a transceiver module 210, memory 215, and a processor module 225, which each may be in communication, directly or indirectly, with each other (e.g., over one or more buses). The transceiver module 210 is configured to communicate bi-directionally, via the antennas 205, with the UEs 115. The transceiver module 210 (and/or other components of the femto-proxy system 290a) is also configured to communicate bi-directionally with a macro communications network 100*a* (e.g., a WWAN). For example, the transceiver module 210 is configured to communicate with the macro communications network 100*a* via a backhaul network. The macro communications network 100*a* may be the communications system 100 of FIG. 1.

The memory 215 may include random access memory (RAM) and read-only memory (ROM). The memory 215 may also store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225, but may be configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 30 ms in length) representative of the received audio, provide the audio packets to the transceiver module 210, and provide indications of whether a user is speaking. Alternatively, an encoder may only provide packets to the transceiver module 210, with the provision or withholding/suppression of the packet itself providing the indication of whether a user is speaking.

The transceiver module 210 may include a modem configured to modulate the packets and provide the modulated packets to the antennas 205 for transmission, and to demodulate packets received from the antennas 205. While some examples of the femto-proxy system 290*a* may include a single antenna 205, the femto-proxy system 290*a* preferably includes multiple antennas 205 for multiple links. For example, one or more links may be used to support macro communications with the UEs 115. Also, one or more out-of-band links may be supported by the same antenna 205 or different antennas 205.

Notably, the femto-proxy system 290*a* is configured to provide both HNB 230*a* and femto-proxy module 240*a* functionality. For example, when the UE 115 approaches the femtocell coverage area, the UE's 115 OOB radio may begin searching for the OOB femto-proxy module 240*a*. Upon discovery, the UE 115 may have a high level of confidence that it is in proximity to the femtocell coverage area, and a scan for the HNB 230*a* can commence.

The scan for the HNB 230*a* may be implemented in different ways. For example, due to the femto-proxy module 240*a* discovery by the UE's 115 OOB radio, both the UE 115 and the femto-proxy system 290*a* may be aware of each other's proximity. The UE 115 scans for the HNB 230*a*. Alternatively, the HNB 230*a* polls for the UE 115 (e.g., individually, or as part of a round-robin polling of all registered UEs 115), and the UE 115 listens for the poll. When the scan for the HNB 230*a* is successful, the UE 115 may attach to the HNB 230*a*.

When the UE 115 is in the femtocell coverage area and attached to the HNB 230*a*, the UE 115 may be in communication with the macro communications network 100*a* via the HNB 230*a*. As described above, the UE 115 may also be a slave of a piconet for which the femto-proxy module 240*a* acts as the master. For example, the piconet may operate using Bluetooth and may include Bluetooth communications links facilitated by a Bluetooth radio (e.g., implemented as part of the transceiver module 210) in the HNB 230*a*.

Examples of the HNB 230*a* have various configurations of base station or wireless access point equipment. As used herein, the HNB 230*a* may be a device that communicates with various terminals (e.g., client devices (UEs 115, etc.), proximity agent devices, etc.) and may also be referred to as, and include some or all the functionality of, a base station, a Node B, and/or other similar devices. Although referred to herein as the HNB 230*a*, the concepts herein are applicable to access point configurations other than femtocell configuration (e.g., picocells, microcells, etc.). Examples of the HNB 230*a* utilize communication frequencies and protocols native to a corresponding cellular network (e.g., the macro communications network 100*a*, or a portion thereof) to facilitate communication within a femtocell coverage area associated with the HNB 230*a* (e.g., to provide improved coverage of an area, to provide increased capacity, to provide increased bandwidth, etc.).

The HNB 230*a* may be in communication with other interfaces not explicitly shown in FIG. 2A. For example, the HNB 230*a* may be in communication with a native cellular interface as part of the transceiver module 210 (e.g., a specialized transceiver utilizing cellular network communication techniques that may consume relatively large amounts of power in operation) for communicating with various appropriately configured devices, such as the UE 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the HNB 230*a* may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the HNB 230*a* may further be in communication with one or more OOB interfaces as part of the transceiver module 210 and/or the femto-proxy module 240*a*. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the UE 115. The OOB interface may, for example, provide a Bluetooth link, an ultra-wideband (UWB) link, an IEEE 802.11 (WLAN) link, etc.

The terms "high power" and "low power" as used herein are relative terms and do not imply a particular level of power consumption. Accordingly, OOB devices (e.g., OOB femto-proxy module 240*a*) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. There is no limitation that the OOB devices and interfaces be low power, short range, and/or low bandwidth. Devices may use any suitable out-of-band link, whether wireless or otherwise, such as IEEE 802.11, Bluetooth, PEANUT, UWB, ZigBee, a wired link, etc.

Femto-proxy modules 240a may provide various types of OOB functionality and may be implemented in various ways. A femto-proxy module 240a may have any of various configurations, such as a stand-alone processor-based system, a processor-based system integrated with a host device (e.g., access point, gateway, router, switch, repeater, hub, concentrator, etc.), etc. For example, the femto-proxy modules 240a may include various types of interfaces for facilitating various types of communications.

Some femto-proxy modules 240a include one or more OOB interfaces as part of the transceiver module 210 (e.g., a transceiver that may consume relatively low amounts of power in operation and/or may cause less interference than in the in-band spectrum) for communicating with other appropriately configured devices (e.g., UE 115) for providing interference mitigation and/or femtocell selection herein through a wireless link. One example of a suitable communication interface is a Bluetooth-compliant transceiver that uses a time-division duplex (TDD) scheme.

Femto-proxy modules 240a may also include one or more backend network interfaces as part of the transceiver module 210 (e.g., packet switched network interface, switched network interface, radio network interface, control network interface, a wired link, and/or the like) for communicating with various devices or networks. A femto-proxy module 240a that is integrated within a host device, such as with HNB 230a, may utilize an internal bus or other such communication interface in the alternative to a backend network interface to provide communications between the femto-proxy module 240a and other devices, if desired. Additionally or alternatively, other interfaces, such as OOB interfaces, native cellular interfaces, etc., may be utilized to provide communication between the femto-proxy module 240a and the HNB 230a and/or other devices or networks.

Various communications functions (e.g., including those of the HNB 230a and/or the femto-proxy module 240a) may be managed using the communications management subsystem 250. For example, the communications management subsystem 250 may at least partially handle communications with the macro (e.g., WWAN) network, one or more OOB networks (e.g., piconets, UE 115 OOB radios, other femto-proxies, OOB beacons, etc.), one or more other femtocells (e.g., HNBs 230), UEs 115, etc. For example, the communications management subsystem 250 may be a component of the femto-proxy system 290a in communication with some or all of the other components of the femto-proxy system 290a via a bus.

Various other architectures are possible other than those illustrated by FIG. 2A. The HNB 230a and femto-proxy module 240a may or may not be collocated, integrated into a single device, configured to share components, etc. For example, the femto-proxy system 290a of FIG. 2A has an integrated HNB 230a and femto-proxy module 240a that at least partially share components, including the antennas 205, the transceiver module 210, the memory 215, and the processor module 225.

Figure 2B:
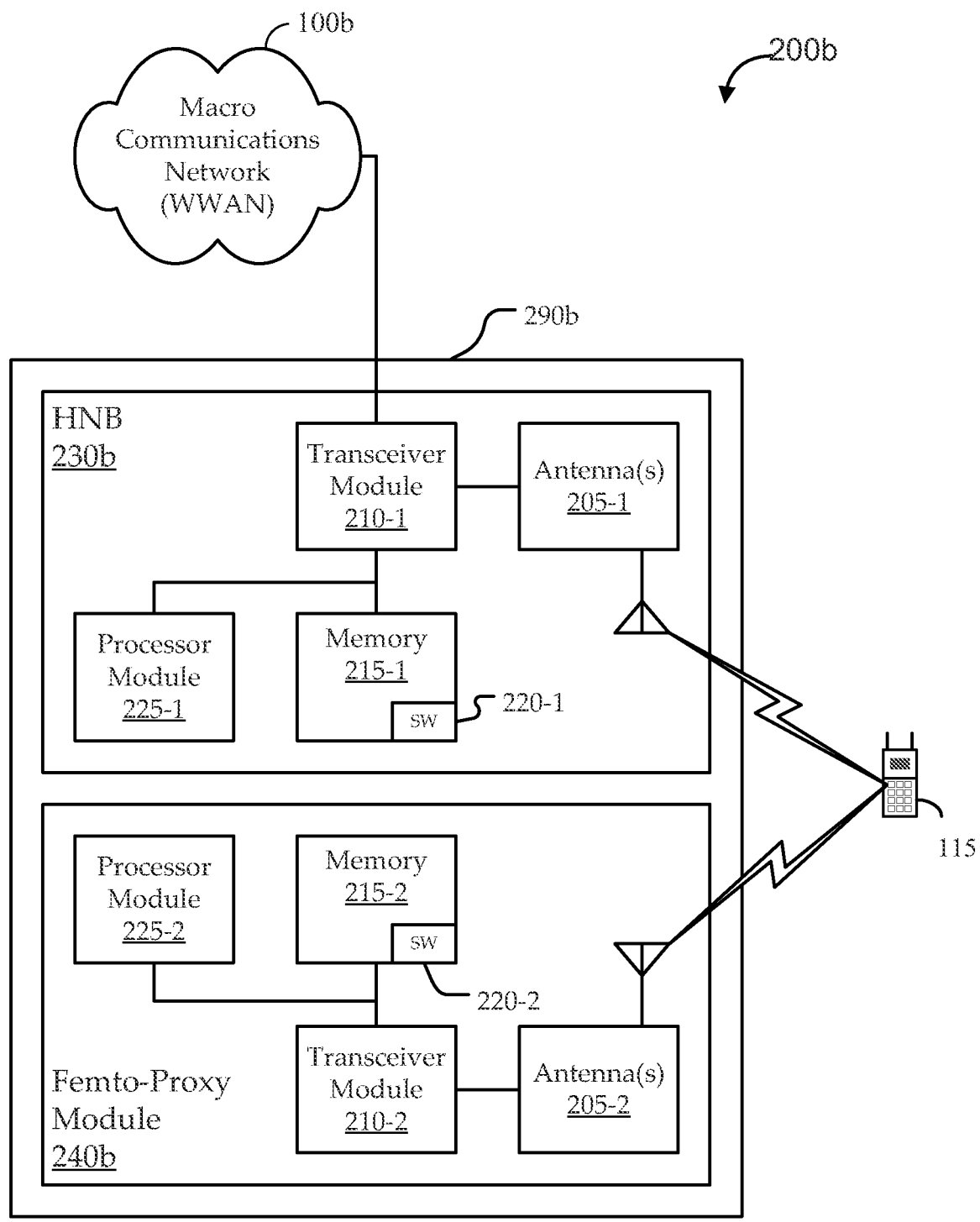
FIG. 2B shows a block diagram of an exemplary wireless communications system that includes an architecture of a femto-proxy system that is different from the architecture shown in FIG. 2A.

FIG. 2B shows a block diagram of a wireless communications system 200b that includes an architecture of a femto-proxy system 290b that is different from the architecture shown in FIG. 2A. Similar to the femto-proxy system 290a, the femto-proxy system 290b includes a femto-proxy module 240b and a HNB 230b. Unlike the system 290a, however, each of the femto-proxy module 240b and the HNB 230b has its own antenna 205, transceiver module 210, memory 215, and processor module 225. Both transceiver modules 210 are configured to communicate bi-directionally, via their respective antennas 205, with UEs 115. The transceiver module 210-1 of the HNB 230b is illustrated in bi-directional communication with the macro communications network 100b (e.g., typically over a backhaul network).

For the sake of illustration, the femto-proxy system 290b is shown without a separate communications management subsystem 250. In some configurations, a communications management subsystem 250 is provided in both the femto-proxy module 240b and the HNB 230b. In other configurations, the communications management subsystem 250 is implemented as part of the femto-proxy module 240b. In still other configurations, functionality of the communications management subsystem 250 is implemented as a computer program product (e.g., stored as software 220-1 in memory 215-1) of one or both of the femto-proxy module 240b and the HNB 230b.

In yet other configurations, some or all of the functionality of the communications management subsystem 250 is implemented as a component of the processor module 225. For example, the processor module 225a may include a WWAN communications controller and a user equipment controller, and may be in communication (e.g., as illustrated in FIGS. 2A and 2B) with the HNB 230 and the femto-proxy module 240. In an exemplary configuration, the WWAN communications controller is configured to receive a WWAN communication for a designated UE 115. The user equipment controller 320 determines how to handle the communication, including affecting operation of the HNB 230 and/or the femto-proxy module 240.

Both the HNB 230a of FIG. 2A and the HNB 230b of FIG. 2B are illustrated as providing a communications link only to the macro communications network 100a. However, the HNB 230 may provide communications functionality via many different types of networks and/or topologies. For example, the HNB 230 may provide a wireless interface for a cellular telephone network, a cellular data network, a local area network (LAN), a metropolitan area network (MAN), a wide area network (WAN), the public switched telephone network (PSTN), the Internet, etc.

Figure 3:
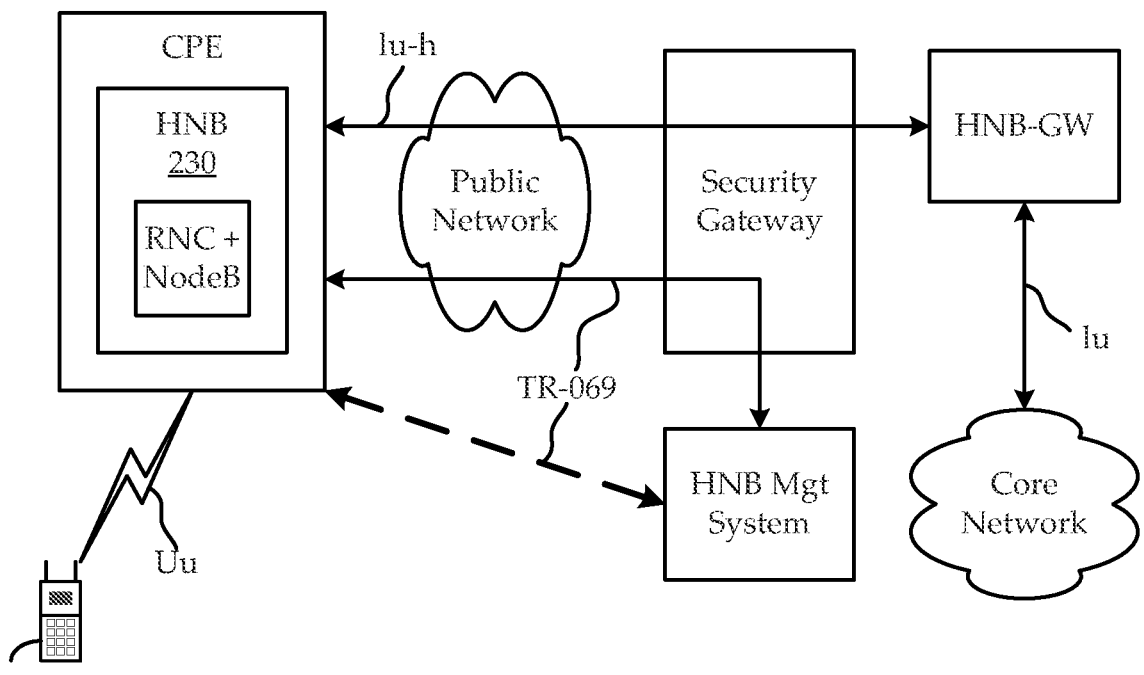
FIG. 3 shows detail regarding an example of a femtocell architecture for an illustrative Universal Mobile Telecommunications System (UMTS) network.

FIG. 3 shows detail regarding an exemplary femtocell (HNB) deployment in a Universal Mobile Telecommunications System (UMTS) network. For example, the illustrative architecture shows a 3GPP deployment, which may include portions of the communications systems and networks shown in FIGS. 1-2B. As illustrated, a UE 115 is in communication with a HNB 230 deployed as part of consumer premises equipment (CPE). The CPE facilitates communications with a security gateway through the public network infrastructure (e.g., the Internet), which further provides access to the HNB's gateway (HNB-GW) and the HNB's management system.

For example, the HNB 230 supports NodeB and RNC-like functions. It connects to the UEs 115 via existing "Uu" interface and to the HNB-GW via a new "Iu-h" interface and may typically be owned by an end user. The HNB-GW concentrates HNB 230 connections (many-to-one relationship between HNBs and HNB-GW) and presents itself as a single RNC to the core network using the existing "Iu" interface. This may allow for scaling to large numbers of HNBs 230, and may avoid new interfaces and HNB-specific functions at the core network. The HNB management system may provision HNB configuration data remotely (e.g., using the TR-069 family of standards). The security gateway may authenticate the HNB 230, and/or may use "IPSec" to provide a secure link between the HNB 230 and the HNB-GW (e.g., over "Iu-h") and between the HNB 230 and the HNB management system (e.g., using a single or different security gateways).

Figure 4A:
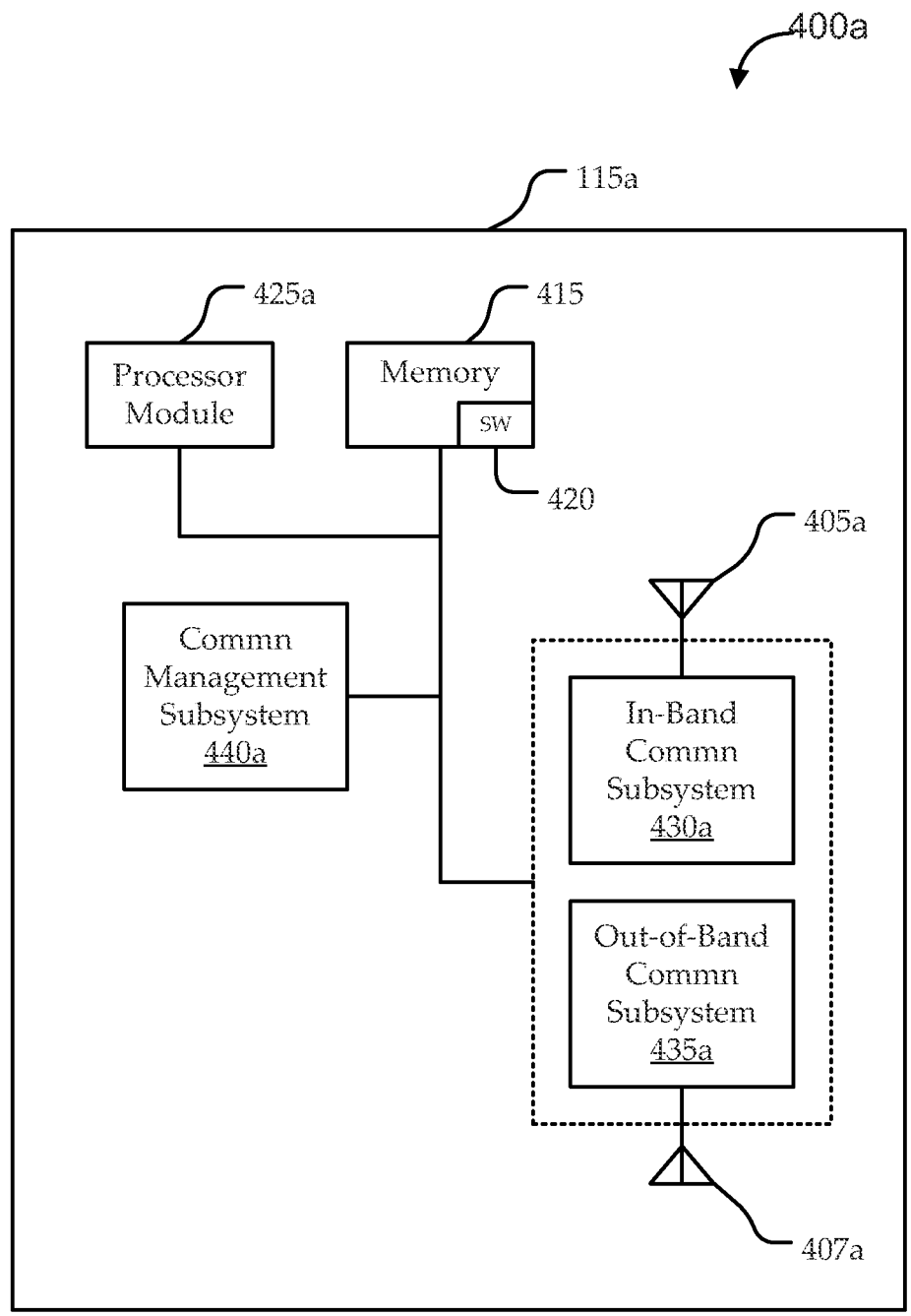
FIG. 4A shows a block diagram of an example of a mobile user equipment for use with the femto-proxy systems of FIGS. 2A and 2B in the context of the communications systems and networks of FIGS. 1-3.
Figure 4B:
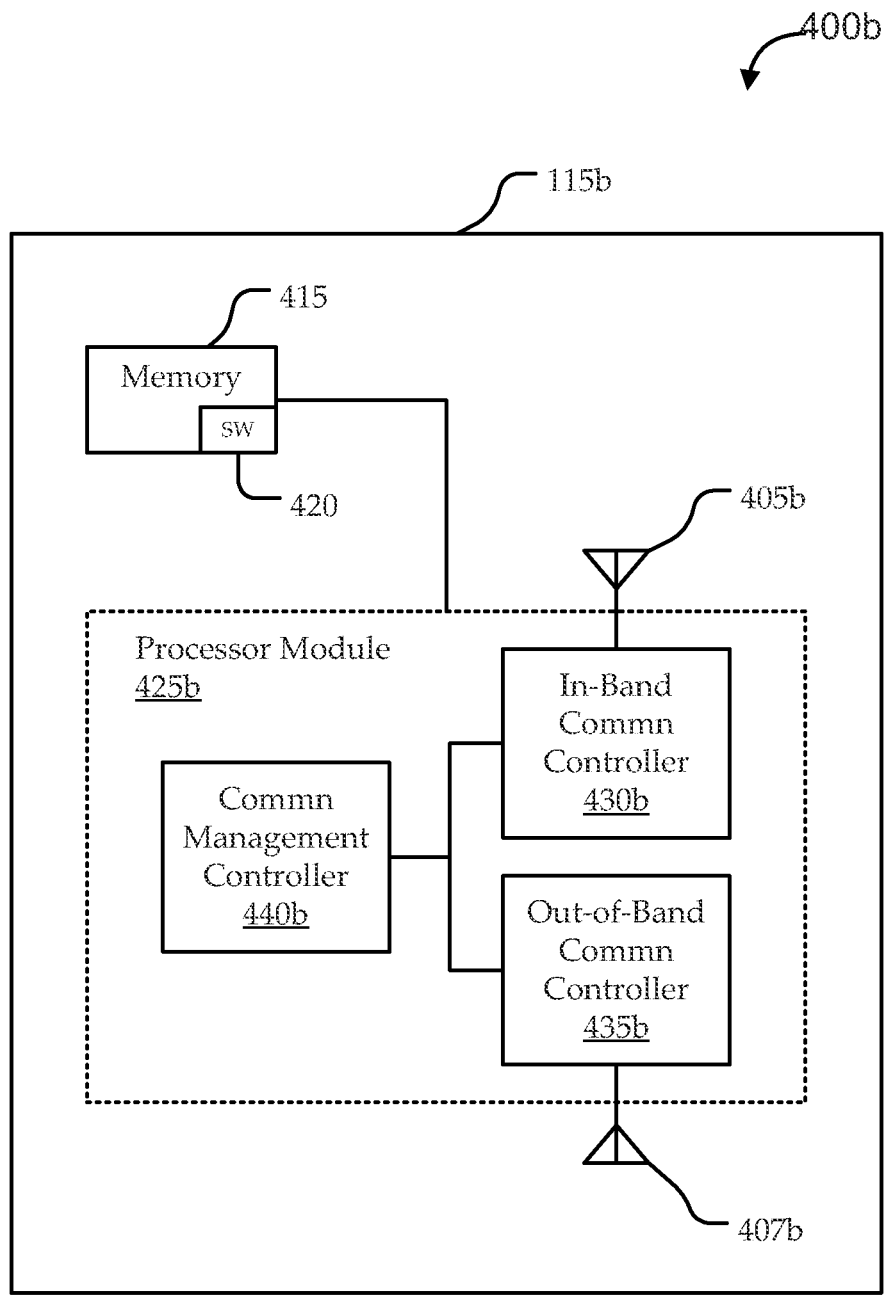
FIG. 4B shows a block diagram of another configuration of a mobile user equipment for use with the femto-proxy systems of FIGS. 2A and 2B in the context of the communications systems and networks of FIGS. 1-3.

As described above, the femto-proxy systems 290 are configured to communicate with client devices, including the UEs 115. FIGS. 4A and 4B show exemplary configurations of UEs 115. Turning to FIG. 4A, a block diagram 400a of a mobile user equipment (UE) 115a for use with the femto-proxy systems 290 of FIGS. 2A and 2B in the context of the communications systems and networks of FIGS. 1-3 is shown. The UE 115a may have any of various configurations, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the UE 115a is assumed to be provided in a mobile configuration, having an internal power supply (not shown), such as a small battery, to facilitate mobile operation.

The UE 115a includes an in-band communications subsystem 430a in communication with an in-band antenna 405a, an OOB communications subsystem 435a in communication with an OOB antenna 407a, a communications management subsystem 440a, memory 415, and a processor module 425a, which each may be in communication, directly or indirectly, with each other (e.g., via one or more buses). The in-band communications subsystem 430a and the OOB communications subsystem 435a are each configured to communicate bi-directionally, via their respective in-band antenna 405a and OOB antenna 407a, and/or via one or more wired or wireless links, with one or more networks, as described above.

In some configurations, the in-band communications subsystem 430a communicates bi-directionally with NodeBs 105 of the macro communications network (e.g., the communications system 100 of FIG. 1) and with at least one HNB 230. The in-band communications subsystem 430a communicates over at least one in-band link. For example, one or more WWAN channels (e.g., frequencies) are used to communicate with macrocells, femtocells, etc. As described more fully below, the in-band communications subsystem 430a may be tuned in to a particular WWAN channel over which active communications are conducted. The in-band communications subsystem 430a may tune away to other WWAN channels to make inter-frequency and/or inter-RAT measurements, as desired.

Configurations of the OOB communications subsystem 435a are configured to communicate over one or more OOB links. For example, the UE 115a communicates with a femto-proxy system 290 (e.g., as described with reference to FIGS. 2A and 2B) over both an in-band (e.g., WWAN) link to the HNB 230 and at least one OOB link to the femto-proxy module 240. The in-band communications subsystem 430a and the in-band antenna 405a are used for the WWAN communications, and the OOB communications subsystem 435a and the OOB antenna 407a are used for the OOB communications. Each communications subsystem may include a modem configured to modulate the packets and provide the modulated packets to the respective antennas (i.e., 405a and 407a) for transmission, and to demodulate packets received via the respective antennas.

Notably, in some configurations, components of the communications subsystems are combined (e.g., shared, integrated, etc.). For example, the UE 115a may include a single antenna that can be used for both in-band and OOB communications. Similarly, a single modem and/or other devices may be used by both the in-band communications subsystem 430a and the OOB communications subsystem 435a.

The memory 415 may include random access memory (RAM) and read-only memory (ROM). The memory 415 may store computer-readable, computer-executable software code 420 containing instructions that are configured to, when executed, cause the processor module 425a to perform various functions described herein (e.g., call processing, database management, message routing, etc.). Alternatively, the software 420 may not be directly executable by the processor module 425a but be configured to cause the computer, e.g., when compiled and executed, to perform functions described herein.

The processor module 425a may include an intelligent hardware device, e.g., a central processing unit (CPU) such as those made by Intel® Corporation or AMD®, a microcontroller, an application specific integrated circuit (ASIC), etc. The processor module 425a may include a speech encoder (not shown) configured to receive audio via a microphone, convert the audio into packets (e.g., 30 ms in length) representative of the received audio, provide the audio packets to one or more of the communications subsystems, and provide indications of whether a user is speaking. Alternatively, an encoder may only provide packets to the communications subsystems, with the provision or withholding/suppression of the packet itself providing the indication of whether a user is speaking.

According to the architecture of FIG. 4A, the UE 115a further includes a communications management subsystem 440. The communications management subsystem 440 may manage communications with the macro (e.g., WWAN) network, one or more OOB networks (e.g., piconets, femto-proxy modules 240, etc.), one or more femtocells (e.g., HNBs 230), other UEs 115 (e.g., acting as a master of a secondary piconet), etc. For example, the communications management subsystem 440 may be a component of the UE 115a in communication with some or all of the other components of the UE 115a via a bus. Alternatively, functionality of the communications management subsystem 440 is implemented as a computer program product, and/or as one or more controller elements of the processor module 425.

The UE 115a includes communications functionality for interfacing with both the macro (e.g., cellular) network and one or more OOB networks (e.g., the femto-proxy module 240 link). For example, some UEs 115 include native cellular interfaces as part of the in-band communications subsystem 430a or the communications management subsystem 440 (e.g., a transceiver utilizing cellular network communication techniques that consume relatively large amounts of power in operation) for communicating with other appropriately configured devices (e.g., for establishing a link with a macro communication network via HNB 230) through a native cellular wireless link. The native cellular interfaces may operate according to one or more communication standards, including, but not limited to, W-CDMA, CDMA2000, GSM, WiMax, and WLAN.

Furthermore, the UEs 115 may also include OOB interfaces implemented as part of the OOB communications subsystem 435a and/or the communications management subsystem 440 (e.g., a transceiver that may consume relatively low amounts of power in operation and/or may cause less interference than in the in-band spectrum) for communicating with other appropriately configured devices over a wireless link. One example of a suitable OOB communication interface is a Bluetooth-compliant transceiver that uses a time-division duplex (TDD) scheme.

According to exemplary configurations of UEs 115, like the one illustrated in FIG. 400a, the in-band communications subsystem 430a is configured to communicatively couple with a femtocell (e.g., HNB 230) over a WWAN link on a first WWAN channel and to communicate with at least one macrocell (e.g., macro NodeB 105) over the WWAN link on a second WWAN channel. The OOB communications subsystem 435a is configured to communicatively couple with an OOB femto-proxy 240 over an OOB link. The communications management subsystem 440a is communicatively coupled with the in-band communications subsystem 430a and the OOB communications subsystem 435a, and is configured to perform various functions in support of compressed mode operations, as described below.

FIG. 4B shows a block diagram 400b of another configuration of a mobile user equipment (UE) 115b for use with the femto-proxy systems 290 of FIGS. 2A and 2B in the context of the communications systems and networks of FIGS. 1-3. The configuration of the UE 115b illustrated in FIG. 4B provides similar or identical functionality to the configuration of the UE 115a illustrated in FIG. 4A, except that much of the functionality is implemented as controllers of the processor 425b, rather than as subsystems.

In particular, the UE 115b includes an in-band communications controller 430b in communication with an in-band antenna 405b, an OOB communications controller 435b in communication with an OOB antenna 407b, and a communications management controller 440b, all implemented as part of the processor module 425b. The processor module 425b may be in communication, directly or indirectly, with a memory 415 (e.g., via one or more buses).

According to exemplary configurations of UEs 115, like the one illustrated in FIG. 4B, the in-band communications controller 430a is configured to communicatively couple with a femtocell (e.g., HNB 230) over a WWAN link on a first WWAN channel and to communicate with at least one macrocell (e.g., macro NodeB 105) over the WWAN link on a second WWAN channel. The OOB communications controller 435a is configured to communicatively couple with an OOB femto-proxy 240 over an OOB link. The communications management controller 440a is communicatively coupled with the in-band communications subsystem 430a and the OOB communications subsystem 435a, and is configured to perform various functions in support of compressed mode operations, as described below.

Compressed Mode Operations

Compressed modes of operation are used by UEs 115 to make measurements, when desired, for example, to determine suitable target cells for handoffs, etc. Many UMTS femtocell deployments are dedicated frequency deployments where femtocells and macrocells are deployed on different frequencies. For such deployments, the Femto UEs (referred to herein as UEs 115, when the UEs 115 are attached to a serving femtocell) have to do inter-frequency and/or inter-RAT measurements when the serving femtocell's signal strength (e.g., CPICH Ec/Io) drops below a certain threshold (e.g., the S_intersearch threshold). For example, the measurements may be needed to determine whether handoffs are required, to determine suitable target cells for handoffs, etc.

Typically, UEs 115 are configured to communicate only on a single WWAN channel (e.g., WCDMA carrier frequency) at any given time. Accordingly, in order to make the inter-frequency measurements, the UEs 115 tune away from the current WWAN channel (where femtocell is deployed) to make the measurements on the different WWAN channel. It is generally desirable to maintain a target data rate at a target data quality. Each data packet includes a payload portion and a redundancy portion, and the amount of redundancy is configured to provide certain data quality. For example, a larger amount of redundancy at a given instantaneous transmit power may reduce the number of retransmissions needed, the average bit error rate, etc. To allow the UE 115 time to tune away from the current WWAN channel while still maintaining a target data rate, techniques may be used for compressing the data communications.

In the so-called compressed mode, transmission and reception are stopped for a short time and the measurements are performed on another frequency or another RAT in that time. For the sake of illustration and clarity, the communications over the WWAN link when not in compressed mode can be considered as having data frames of certain duration, where a certain amount of data is communicated during each frame (e.g., to satisfy the target data rate). During compressed mode operations, the data frames may be compressed to make room for interspersed (e.g., periodic) measurement blocks. For example, the measurement blocks are effectively gaps in the data transmissions. The measurement blocks may be configured to have a duration that is long enough to support tuning away from the current WWAN channel, making one or more measurements (typically a measurement on a single WWAN channel per measurement block), and tuning back to the active WWAN channel.

It will be appreciated that various techniques are possible for implementing frames. For example, in some configurations, each data frame includes a number of slots, and 1 to 7 slots per data frame can be allocated as a measurement block for the UE 115 to perform inter-frequency measurements. Further, the slots designated for the measurement block can be in the middle of a single data frame, spread over two data frames, etc.

Conventionally, because of bandwidth and/or other constraints, compressed mode operations involve reducing the amount of payload and/or redundancy data being communicated. For example, a spreading factor may be decreased (e.g., by a factor of 2) to increase the data rate so bits will get sent twice as fast, bits may be "punctured" by removing various bits from the original data to reduce the amount of information that needs to be transmitted, or higher layer scheduling can be changed to use fewer timeslots for user traffic. It will be appreciated that attempting to send the same amount of data in a smaller amount of time may limit the amount of redundancy data that may be communicated, which may reduce the quality (e.g., fidelity) of the data. Accordingly, the instantaneous transmit power may be increased in the compressed frame in an attempt to maintain satisfaction of the quality target (BLER, FER, etc.) in light of reduced processing gain. The amount of power increase may depend on the compression technique used.

In many typical femto deployments, the transmit power of the femtocell is capped. Accordingly, it may be difficult or impossible to increase the transmit power to a level that is sufficient to compensate for the data compression. For example, transmitting with higher transmit power during compressed data frames may increase interference between the femtocell and any neighboring macrocells and femtocells, especially those on the same frequency (note that macrocells sharing a frequency with the femtocell could belong to a different RAT, as well).

Limitations of conventional compressed mode operations may be further impacted by additional signaling needed to support the compressed mode. For example, signaling may be needed to dictate when and how measurement blocks are interspersed among data frames (e.g., if measurement blocks occur periodically, if measurement blocks are requested on demand, etc.). The rate and type of compressed frames may be variable and may depend on the environment and on various measurement requirements. The added signaling data may further reduce the amount of resources available for communicating payload data, which may require, for example, further data compression, further transmit power increases, etc.

FIGS. 5-9E describe various novel techniques for using an OOB link to address certain limitations of conventional compressed mode operations. These techniques may be implemented, for example, using UEs 115 like those described with reference to FIGS. 4A and 4B, in communication with femto-proxy systems 290, like those described with reference to FIGS. 2A and 2B. According to various embodiments, certain conventional communications are implemented between the in-band communications subsystem 430a of the UE 115 and the HNB 230 of the femto-proxy system 290, and supplemental communications are implemented to support compressed mode operations over the OOB link between the OOB communications subsystem 435a of the UE 115 and the OOB femto-proxy 240 of the femto-proxy system 290.

Figure 5:
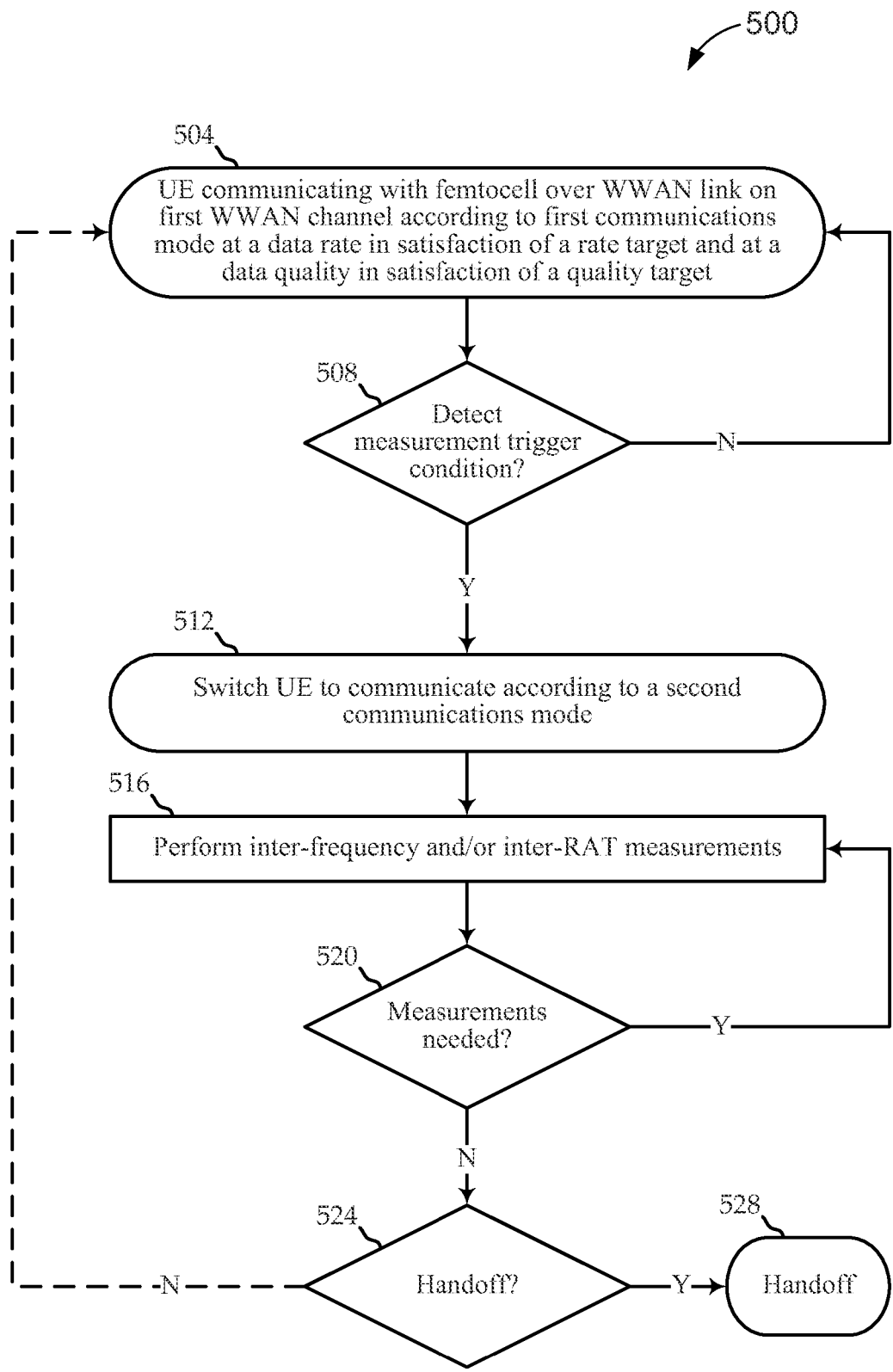
FIG. 5 shows a flow diagram of an exemplary method for using multiple communications modes to support inter-frequency and/or inter-RAT measurements.

FIG. 5 shows a flow diagram of an exemplary method 500 for using multiple communications modes to support inter-frequency and/or inter-RAT measurements. The method 500 begins at stage 504 when a UE is communicating with a femtocell over a WWAN link on first WWAN channel according to a first communications mode at a data rate in satisfaction of a rate target and at a data quality in satisfaction of a quality target. For example, a UE 115 is communicating with a HNB 230 of a femto-proxy system 290 over the WWAN link according to a normal (i.e., uncompressed) communications mode.

At stage 508, a determination is made as to whether a measurement trigger condition has been detected. For example, it may be desirable for the UE 115 to perform inter-frequency measurements when the serving femtocells signal strength (CPICH Ec/Io) drops below a predetermined S_intersearch threshold. If it is determined at stage 508 that no measurement trigger condition has been detected, the UE 115 may continue to communicate according to the first communications mode (e.g., according to stage 504).

If it is determined at stage 508 that a measurement trigger condition has been detected, the UE 115 may be switched to communicate according to a second communications mode at stage 512. For example, the UE 115 may enter a compressed mode of operation, whereby data communications are compressed to make room for interspersed measurement blocks. At stage 516, according to the second (e.g., compressed) communications mode, the UE 115 performs inter-frequency and/or inter-RAT measurements. For example, each measurement block is long enough to allow the UE 115 to tune away from the serving femtocell's WWAN channel, measure signal strength on a different WWAN channel, and tune back to the serving femtocell's WWAN channel.

At stage 520, a determination is made as to whether measurements no longer need to be made. For example, the signal strength on the current channel may rise above a predetermined threshold level before any handoff occurs, a handoff may occur, etc. If it is determined at stage 520 that measurements still need to be made, additional inter-frequency and/or inter-RAT measurements are made at stage 516.

If it is determined at stage 520 that no more measurements need to be made, the method 500 may proceed in various ways. For example, as illustrated, a determination may be made at stage 524 as to whether a handoff is required according to the measurements made in stage 520. If a handoff is required, a handoff routine may commence at stage 528, Otherwise, the UE 115 may switch back to operating in the first (non-compressed mode) communications mode at stage 504.

Figure 6:
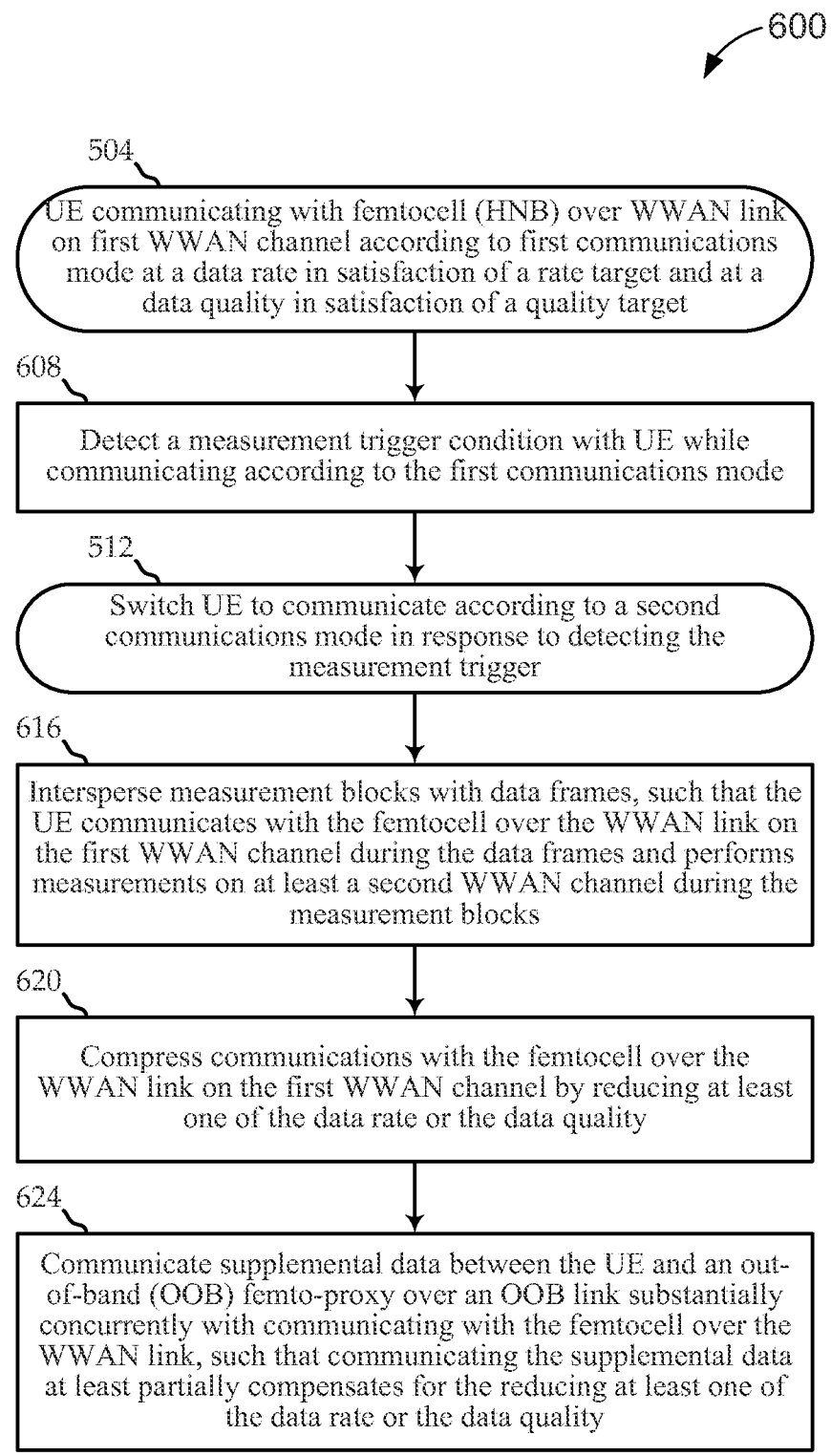
FIG. 6 shows a flow diagram of an exemplary method for using OOB communications to facilitate compressed mode operations.

As described above, embodiments include various novel approaches to compressed mode operations. FIG. 6 shows a flow diagram of an exemplary method 600 for using OOB communications to facilitate compressed mode operations. For the sake of clarity, the method is shown in context of stages 504 and 512 of FIG. 5. In particular, the method 600 may begin at stage 504 when a UE 115 is communicating with a femtocell over a WWAN link on first WWAN channel according to a first communications mode at a data rate in satisfaction of a rate target and at a data quality in satisfaction of a quality target.

Unlike the determination at stage 508 shown in FIG. 5, it is assumed in the context of the method 600 of FIG. 6 that a measurement trigger condition is detected by the UE 115 while communicating in the first communications mode at stage 608. Accordingly, at stage 512, the UE 115 may be switched to communicate according to a second communications mode. As described above, the second communications mode is a type of compressed mode of operation, whereby data communications are compressed to make room for interspersed measurement blocks.

At stage 616, measurement blocks are interspersed with data frames, such that the UE communicates with the femtocell over the WWAN link on the first WWAN channel during the data frames and performs measurements on at least a second WWAN channel during the measurement blocks. Interspersing of measurement blocks may be implemented in a number of different ways. According to one technique, each data frame includes a number of slots. In the first communications mode, all these slots are used for data communications, while, in the second communications mode, a portion of the slots (e.g., 1-7 per frame) are used as a measurement block).

As discussed above, interspersing measurement blocks at stage 616 may reduce the resources available on the WWAN link for data communications. Accordingly, at stage 620, communications with the femtocell are compressed over the WWAN link on the first WWAN channel by reducing at least one of the data rate or the data quality. For example, techniques like bit puncturing or adjustment of coding or modulation schemes may be used to send substantially the same amount of payload data in a smaller effective data frame (e.g., a data frame having fewer slots, etc.). Some of these techniques are described more fully below.

The reduction in data rate or data quality according to stage 620 may cause undesirable effects, such as a decrease in the amount of data that can be communicated during compressed mode operations, or an increase in packet erasure rate, bit error rate, etc. To avoid or at least mitigate these undesirable effects, techniques are used to compensate for the reduction in data rate or data quality. As discussed above, conventional deployments may increase instantaneous transmit power, which may create other undesirable effects (e.g., increased interference) and/or may not be sufficient to compensate for the reduction in data rate or data quality.

At stage 624, supplemental data is communicated between the UE and an out-of-band (OOB) femto-proxy over an OOB link substantially concurrently with communicating with the femtocell over the WWAN link, such that communicating the supplemental data at least partially compensates for the reducing at least one of the data rate or the data quality. In some configurations, more than one OOB link is used (e.g., concurrently) for communicating the supplemental data. For example, as described with reference to FIG. 4A, the UE 115a communicates with a femto-proxy system 290 (e.g., as described with reference to FIGS. 2A and 2B) over both an in-band (e.g., WWAN) link to the HNB 230 and at least one OOB link to the femto-proxy module 240. The in-band communications subsystem 430a and the in-band antenna 405a are used for the WWAN communications, and the OOB communications subsystem 435a and the OOB antenna 407a are used for the OOB communications of supplemental data in support of the compressed mode operations. Alternatively, multiple OOB antennae 407 can be used to support multiple concurrent OOB links (e.g., Bluetooth and Zigbee).

Figure 7A:
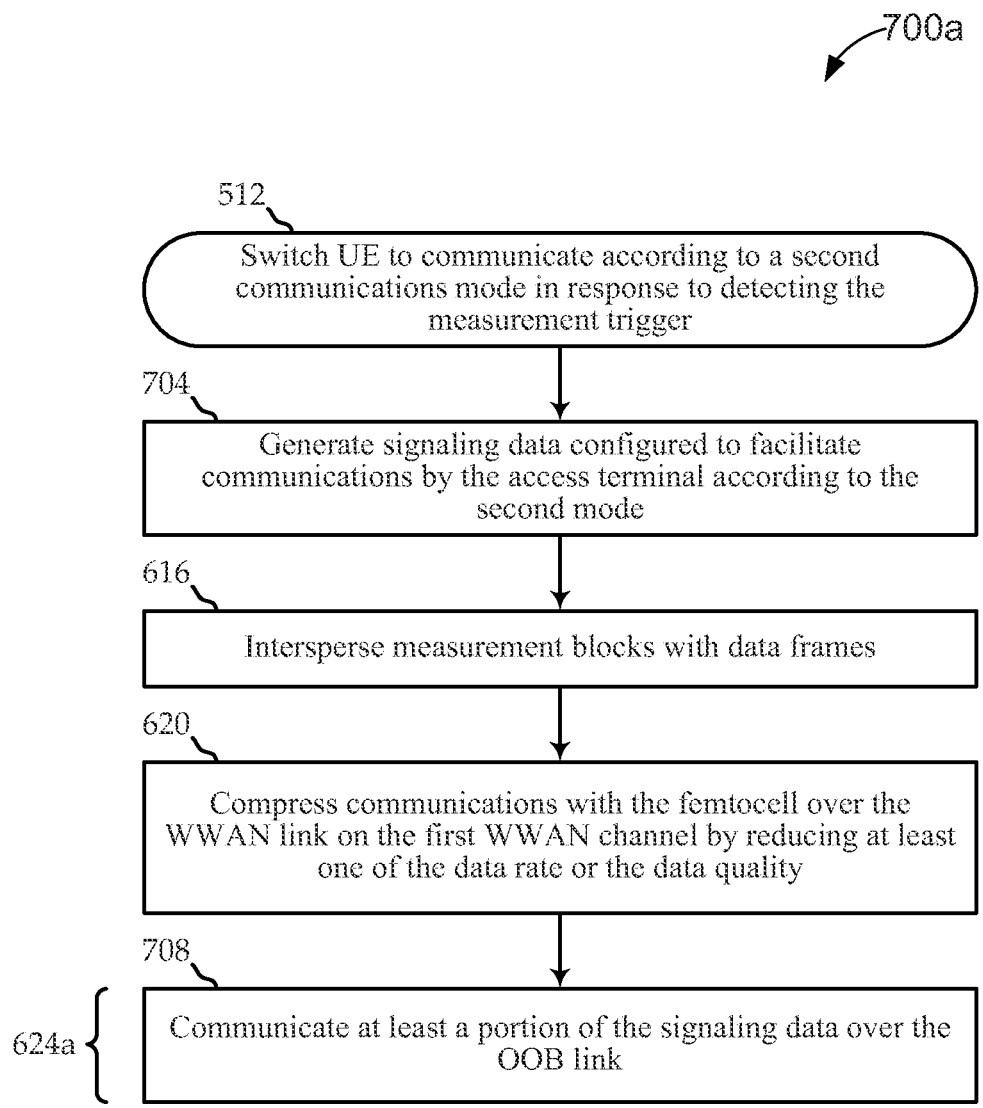
FIG. 7A shows a flow diagram of an exemplary method for using OOB communications to communicate signaling data in support of compressed mode operations.
Figure 7B:
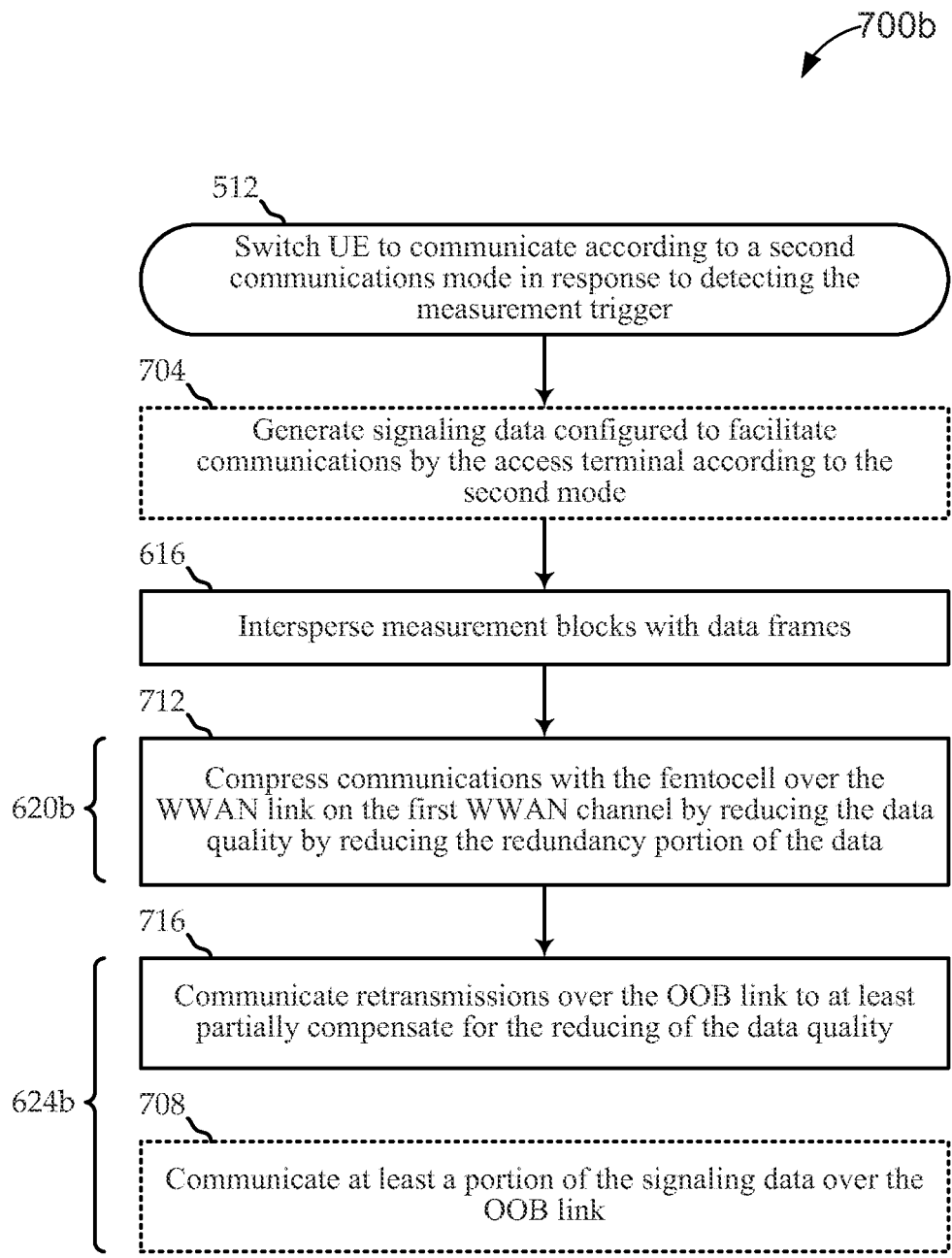
FIG. 7B shows a flow diagram of an exemplary method for using OOB communications to communicate retransmissions and/or similar supplemental data in support of compressed mode operations.
Figure 7C:
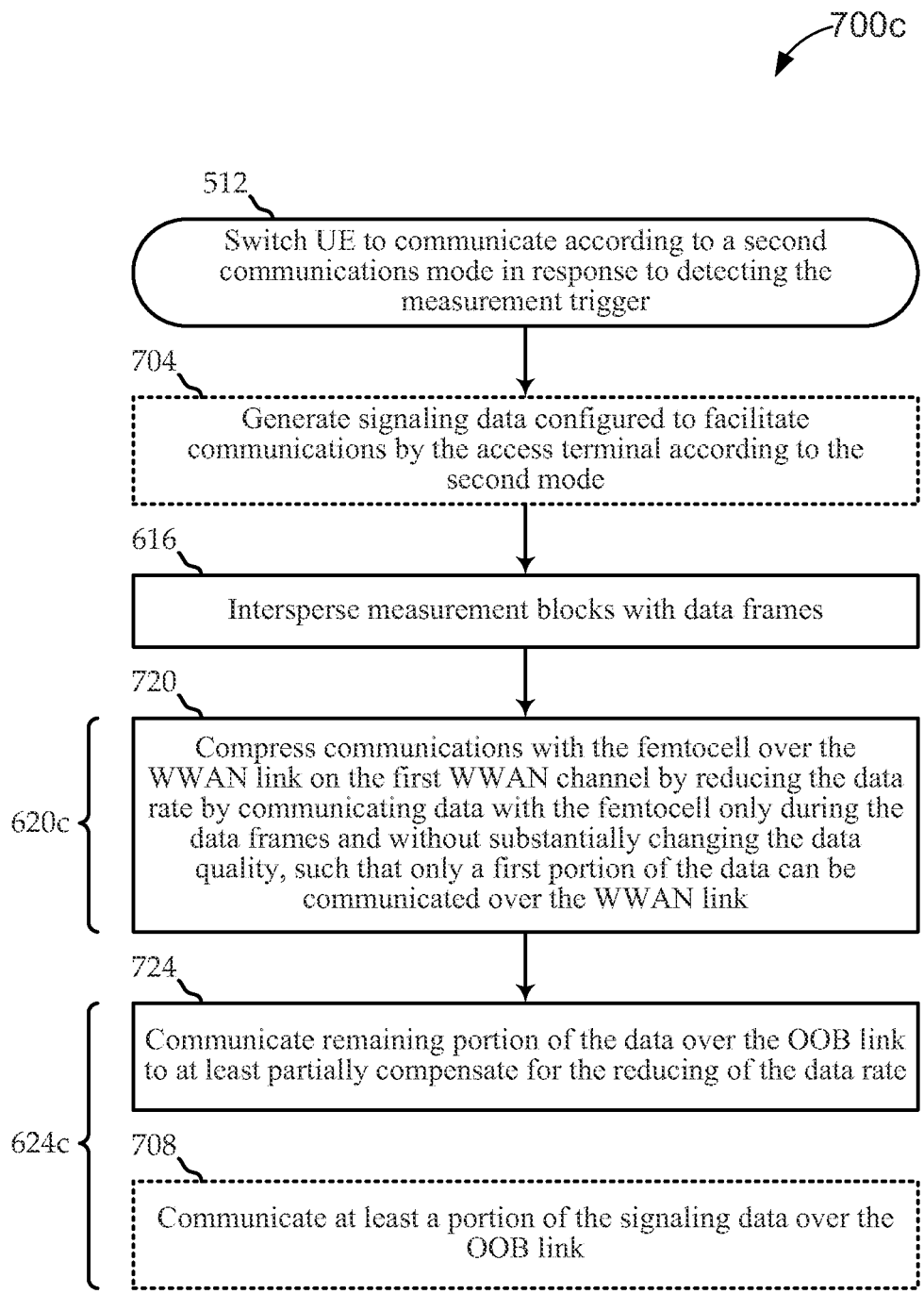
FIG. 7C shows a flow diagram of an exemplary method for using OOB communications to communicate portions of data not communicated over the WWAN link in support of compressed mode operations.

Various techniques for using the OOB link to provide supplemental data in support of the compressed mode operations are illustrated in FIGS. 7A-7C. FIG. 7A shows a flow diagram of an exemplary method 700a for using OOB communications to communicate signaling data in support of compressed mode operations. For the sake of context, the method 700a is shown beginning at stage 512, when the UE 115 is communicating in the second communications mode (e.g., compressed mode) in response to detecting a measurement trigger condition.

At stage 704, signaling data is generated to facilitate communications by the user equipment according to the second mode. For example, signaling data can be used in compressed mode to define what frames are compressed; a rate, periodicity, and/or type of compressed frames, a request for on-demand compressed frames, etc. At stage 616, measurement blocks are interspersed with data frames according to the signaling data generated in stage 704.

Data communications over the WWAN link may be compressed at stage 620. According to some techniques, compression of the data communications is implemented in a conventional way (e.g., by compressing data into smaller frames with less redundancy and increasing instantaneous transmit power as a compensatory technique). According to other techniques, compression of the data communications is implemented in such a way that substantially the same amount of payload data is communicated in a smaller amount of time (e.g., by reducing redundancy, and thereby reducing the data quality) without increasing instantaneous transmit power to compensate for the reduction in data quality. According to still other techniques, compression of the data communications is implemented in such a way that data communications over the WWAN link are effectively halted during measurement blocks (e.g., thereby reducing the data rate).

According to some embodiments of stage 624 of FIG. 6 (illustrated as stage 624a in FIG. 7A), at least a portion of the signaling data is communicated over the OOB link at stage 708. For example, as described above, the added signaling data may further impact resources available on the WWAN link for data communications. Accordingly, the method 700a uses the OOB link to communicate the added signaling data, thereby leaving the WWAN link for the compressed data communications only.

FIG. 7B shows a flow diagram of an exemplary method 700b for using OOB communications to communicate retransmissions and/or similar supplemental data in support of compressed mode operations. As in FIG. 7A, for the sake of context, the method 700b is shown beginning at stage 512, when the UE 115 is communicating in the second communications mode (e.g., compressed mode) in response to detecting a measurement trigger condition. Also as in FIG. 7A, some configurations of the method 700b include generation of compressed mode signaling data at stage 704 and communication of at least some of the signaling data over the OOB link at stage 708.

For the sake of clarity, the method is shown in the context of stages 616-624 of FIG. 6. Measurement blocks are interspersed with data frames at stage 616, data communications over the WWAN link are compressed to make room for the measurement blocks at stage 620, and supplemental data is communicated over the OOB link in support of the compressed mode operations at stage 624.

According to the technique of FIG. 7B, compressing communications with the femtocell over the WWAN link on the first WWAN channel (illustrated as 620b) involves reducing the data quality by reducing the redundancy portion of the data at stage 712. As used herein, the "redundancy data" or "redundancy portion of the data" is intended to generally refer to any bits used to reinforce the data transmission for more reliable communications. This may typically include redundant bits and/or data that can be used to derive redundant bits using defined algorithms. One illustrative technique uses bit puncturing to reduce the amount of data being transmitted. Another illustrative technique selects a higher order modulation scheme and/or coding scheme that uses a smaller amount of redundancy data (e.g., forward error correction (FEC) data, etc.).

Compressing the data communications according to stage 712 may allow substantially continued satisfaction of the data rate target at the expense of a reduction in data quality. For example, a reduction in redundancy data may cause fewer packets to be successfully delivered. Rather than increasing instantaneous transmit power to compensate for these effects (e.g., or rather than increasing instantaneous transmit power to the same extent as in conventional deployments), the OOB link can be used to compensate for the reduction in data quality.

Notably, the total data rate will certainly be reduced by reducing the redundancy. However, the data rate target is concerned with the "goodput," or the effective throughput. This goodput can be increased or maintained without sending more redundant bits, so long as other compensatory techniques are used. Accordingly, reference to increasing or maintaining the "data rate" herein is intended to suggest increasing or maintaining the goodput. For example, maintaining the data rate according to stage 712 corresponds to maintaining the amount of desired payload data that is successfully delivered, even though the total amount of sent data is reduced.

Compensatory use of the OOB link according to the method 700b is illustrated as stage 624b. For example, it may be assumed that the reduction in data quality will cause an increase in the amount of retransmissions and/or other compensatory data needed to satisfy the quality target. At stage 716, retransmissions are communicated over the OOB link to at least partially compensate for the reducing of the data quality. As used herein, "retransmissions" is used to generally include any type of compensatory data that may be useful for improving the data quality (e.g., FEC data, punctured bits, etc.). Further, as discussed above, the need for additional signaling data (according to stage 704) may place additional resource burdens on the compressed mode communications. Accordingly, in some embodiments, the compensatory use of the OOB link (according to stage 624b) also includes communication of at least some signaling data over the OOB link at stage 708.

FIG. 7C shows a flow diagram of an exemplary method 700c for using OOB communications to communicate portions of data not communicated over the WWAN link in support of compressed mode operations. As in FIGS. 7A and 7B, for the sake of context, the method 700c is shown beginning at stage 512, when the UE 115 is communicating in the second communications mode (e.g., compressed mode) in response to detecting a measurement trigger condition. Also as in FIGS. 7A and 7B, some configurations of the method 700c include generation of compressed mode signaling data at stage 704 and communication of at least some of the signaling data over the OOB link at stage 708.

For the sake of clarity, the method is shown in the context of stages 616-624 of FIG. 6. Measurement blocks are interspersed with data frames at stage 616, data communications over the WWAN link are compressed to make room for the measurement blocks at stage 620, and supplemental data is communicated over the OOB link in support of the compressed mode operations at stage 624.

According to the technique of FIG. 7C, compressing communications with the femtocell over the WWAN link on the first WWAN channel (illustrated as 620*c*) involves communicating data with the femtocell only during the data frames and without substantially changing the data quality, such that only a first portion of the data can be communicated over the WWAN link at stage 720. For example, in the first communications mode, each data frame includes a number of slots, and a certain amount of data is communicated at a certain fidelity during each slot. In the second communications mode (e.g., compressed mode), the number of frames available for data communications is decreased to make room for measurement blocks (e.g., according to stage 612). In the reduced number of data communications slots, data continues to be communicated at substantially the same rate and fidelity, causing the overall data rate to be reduced (i.e., due to fewer slots being available for the communications).

Compensatory use of the OOB link according to the method 700*c* is illustrated as stage 624*c*. For example, suppose a certain amount of data would be communicated over a certain amount of time and at a certain fidelity according to the first communications mode, but only a portion of the data is communicated over the same amount of time at the same fidelity according to the second communications mode (i.e., as data is not communicated during the measurement blocks and is not otherwise being substantially compressed). This may effectively leave a remaining portion of data that is not communicated over the WWAN link (e.g., the portion that would otherwise have been communicated during the measurement blocks). At stage 724, the remaining portion of the data is communicated over the OOB link to at least partially compensate for reducing the data rate. According to various techniques, the remaining portion of the data may be communicated over the OOB link only during the measurement blocks, or alternatively, communication of the remaining portion may be spread over a larger and/or or other time duration. Further, as discussed above, the need for additional signaling data (according to stage 704) may place additional resource burdens on the compressed mode communications. Accordingly, in some embodiments, the compensatory use of the OOB link (according to stage 624*b*) also includes communication of at least some signaling data over the OOB link at stage 708.

For the sake of added clarity, FIGS. 8A-9E illustrate various embodiments of compressed mode techniques, with FIGS. 9A-9E focusing on various embodiments of the methods 700 of FIGS. 7A-7C. The embodiments shown are intended only to be illustrative and should not be construed as limiting. Rather, it will be appreciated that the various techniques described in FIGS. 7A-7C can be used independently or in various combinations, and can be modified in various ways without departing from the scope of the disclosure or the claims.

Figure 8A:
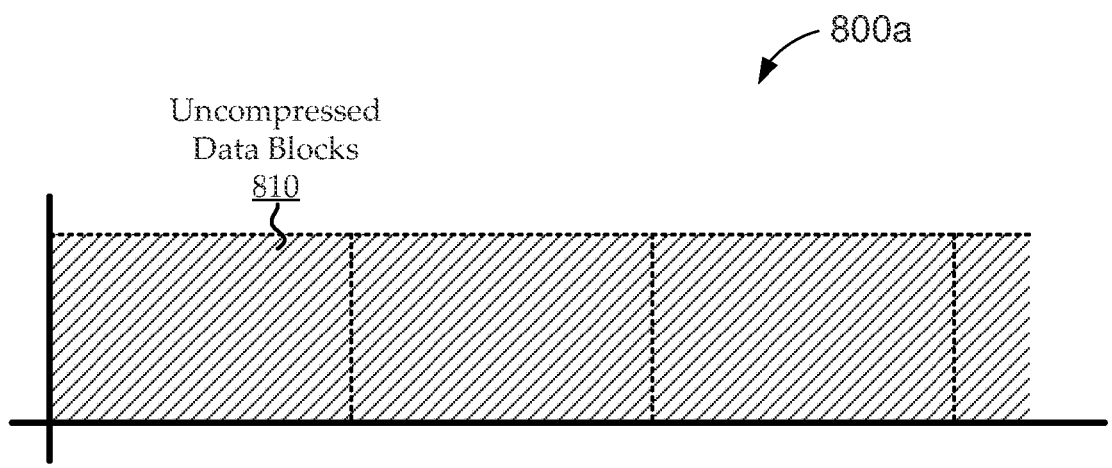
FIG. 8A shows a simplified communication diagram for data communications over a communications link in a non-compressed mode.

Turning to FIG. 8A, a simplified communication diagram 800*a* is shown for data communications over a communications link in a non-compressed mode. As illustrated, data is communicated in data blocks 810. Each data block 810 may represent a data frame, which may include a number of slots during which data is communicated at a certain rate and at a certain quality (e.g., fidelity). For the sake of simplicity, each data block 810 is shown to directly follow a preceding data block 810 of the same duration. It will be appreciated that various communications protocols and techniques are possible, which may, for example, have different and/or varying data block 810 durations, certain periods during which data is not communicated, etc.

Figure 8B:
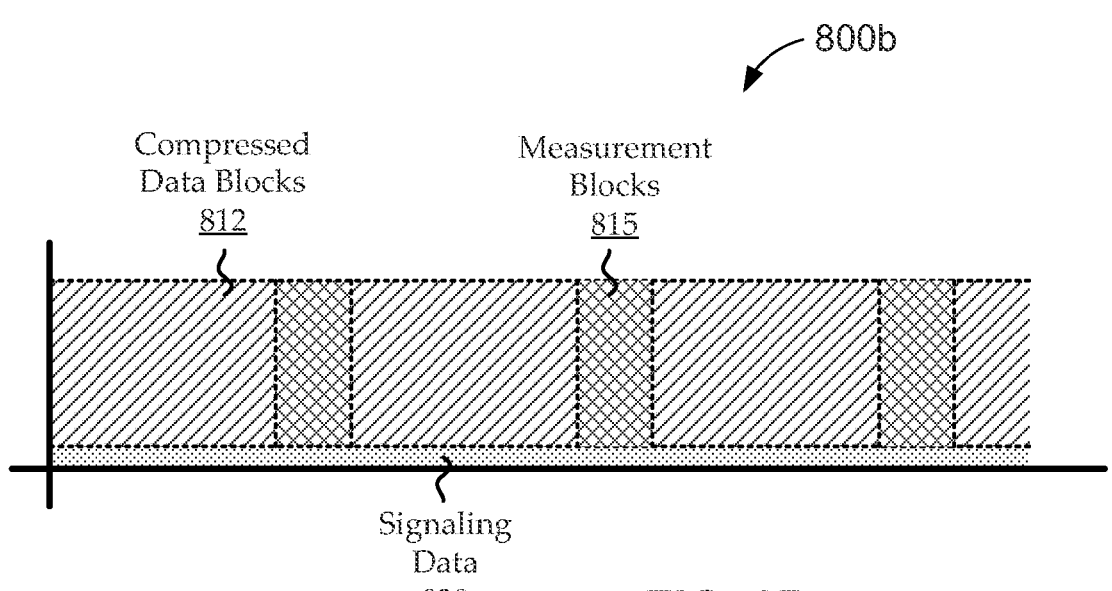
FIG. 8B shows a simplified communication diagram for data communications over a communications link in a compressed mode.

FIG. 8B shows a simplified communication diagram 800*b* for data communications over a communications link in a compressed mode. As illustrated, data is communicated in compressed data blocks 812 with interspersed measurement blocks 815. Each compressed data block 812 may represent a data frame having fewer slots than a corresponding uncompressed data block 810 (e.g., with the other slots being used as a measurement block 815. For the sake of simplicity, each compressed data block 812 is shown to directly follow a preceding compressed data block 812 of the same duration, and measurement blocks 815 are shown interspersed with each compressed data block 812.

It will be appreciated that various compressed mode techniques are possible, which may, for example, have different and/or varying compressed data block 812 durations; different and/or varying measurement block 815 durations, periodicity, etc. (e.g., including on-demand techniques); certain periods during which data is not communicated; etc. As described above, these various compressed mode techniques are typically supported by generation and communication of signaling data 820.

According to conventional techniques, non-compressed communications modes as in FIG. 8A and compressed communications modes as in FIG. 8B involve data communications only on a WWAN channel (e.g., with measurement blocks involving measurements on one or more other WWAN channels). As described above, novel techniques described herein use the OOB link to communicate supplementary data in support of compressed mode operations. Some such techniques are illustrated in FIGS. 9A-9E.

Figure 9A:
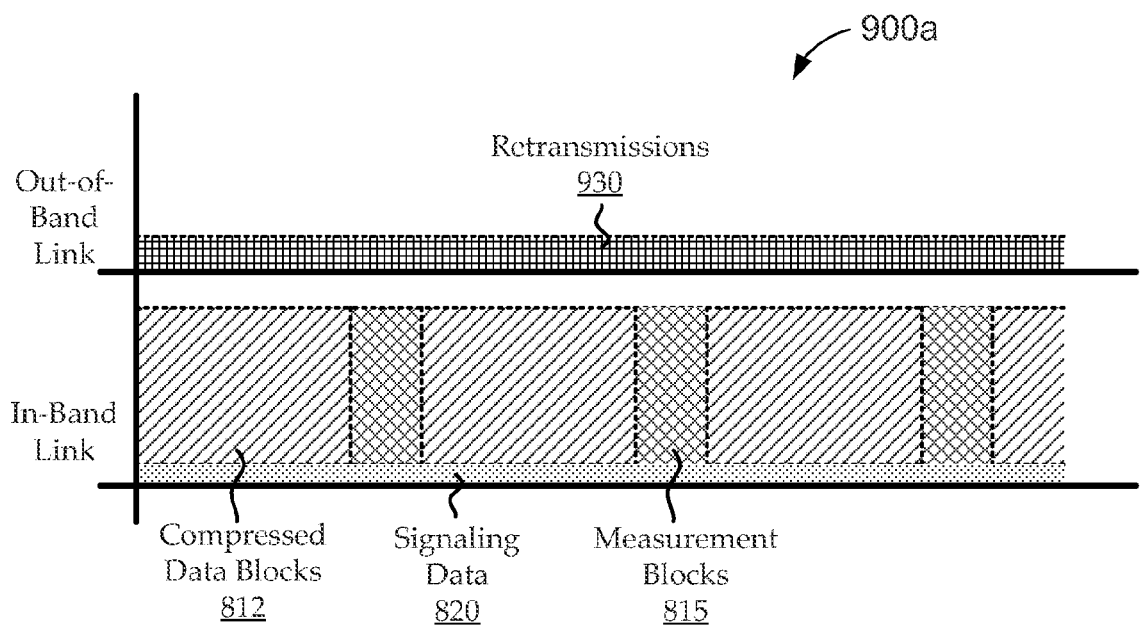
FIG. 9A shows a simplified communication diagram for data communications over a communications link in a compressed mode, where the OOB link is used for communication of retransmissions.

FIG. 9A shows a simplified communication diagram 900*a* for data communications over a communications link in a compressed mode, where the OOB link is used for communication of retransmissions. The communication diagram 900*a* may, for example, represent an embodiment of techniques, such as those described with reference to FIG. 7B. As in FIG. 8B, data is communicated on the in-band (WWAN) link in compressed data blocks 812 with interspersed measurement blocks 815. Signaling data 820 is also communicated on the in-band link. The OOB link is used to communicate retransmissions and/or other types of data to compensate for any reduction in data quality resulting from the use of compressed data blocks 812.

Figure 9B:
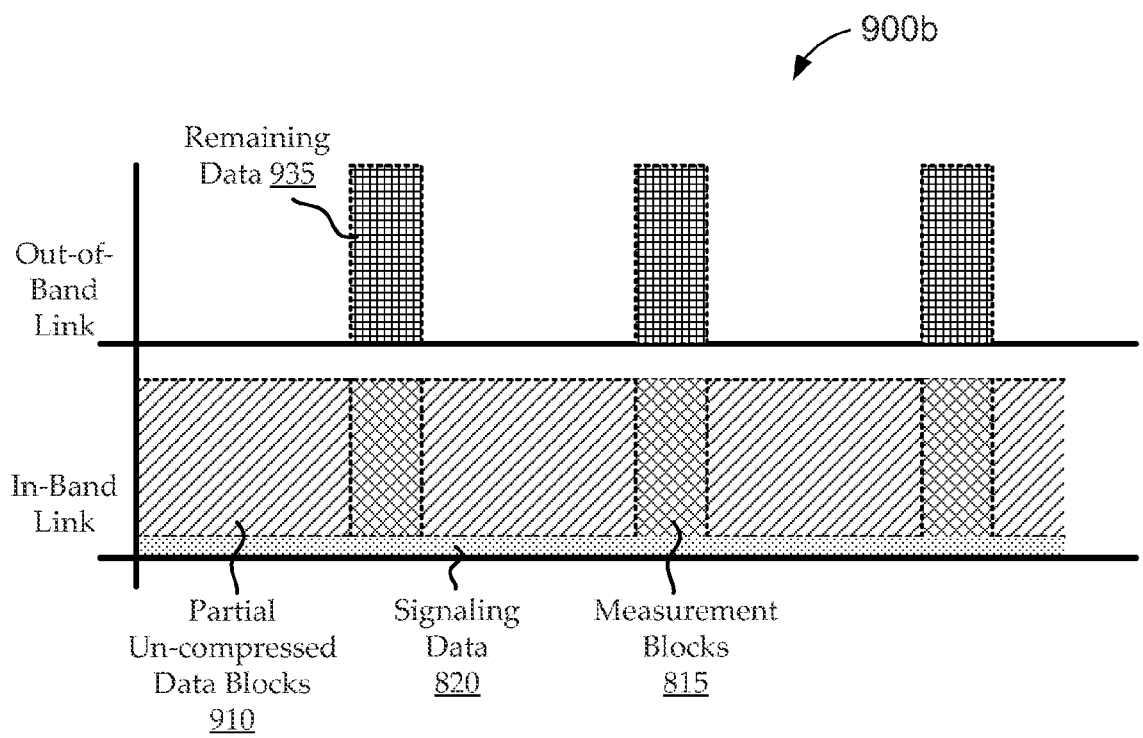
FIG. 9B shows a simplified communication diagram for data communications over a communications link in a compressed mode, where the OOB link is used for communication of remaining data not communicated over the WWAN link.

FIG. 9B shows a simplified communication diagram 900*b* for data communications over a communications link in a compressed mode, where the OOB link is used for communication of remaining data not communicated over the WWAN link. The communication diagram 900*b* may, for example, represent an embodiment of techniques, such as those described with reference to FIG. 7C. Rather than using compressed data blocks 812 to communicate data over the WWAN link, partial data blocks are used with uncompressed data communications, indicated as partial un-compressed data blocks 910.

For example, each un-compressed data block 810 includes a number of slots for data communications, and each partial un-compressed data block 910 includes fewer slots for data communications. However, the data communicated during those slots is communicated at substantially the same rate and quality for both un-compressed data blocks 810 and partial un-compressed data blocks 910. Accordingly, slots that were used for data communications in non-compressed mode are now used for measurement block 815 in compressed mode, and data that would otherwise be communicated during those slots in non-compressed mode is not communicated over the WWAN link. This "remaining" data 935 is, instead, communicated over the OOB link to maintain satisfaction of the overall data rate target. Notably, as illustrated in FIG. 9B, signaling data 820 may also be communicated on the in-band link.

Figure 9C:
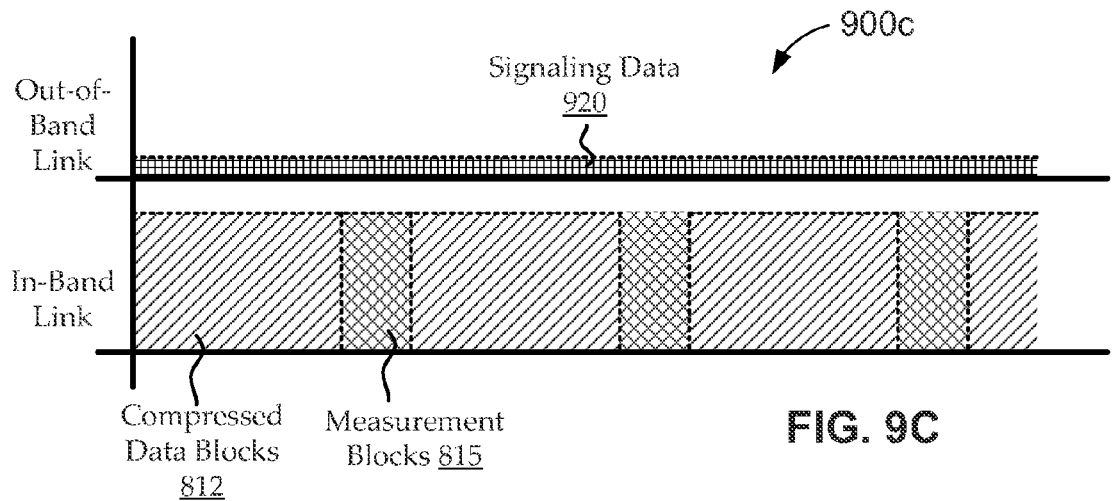
FIG. 9C shows a simplified communication diagram for data communications over a communications link in a compressed mode, where the OOB link is used for communication of signaling data.

FIG. 9C shows a simplified communication diagram 900c for data communications over a communications link in a compressed mode, where the OOB link is used for communication of signaling data. The communication diagram 900c may, for example, represent an embodiment of techniques, such as those described with reference to FIG. 7A. As shown, some or all of the signaling data 920 for compressed mode operation is communicated over the OOB link, while conventional techniques are otherwise used for compressed mode communications over the WWAN link (e.g., including compressed data blocks 812 with interspersed measurement blocks 815.

Figure 9D:
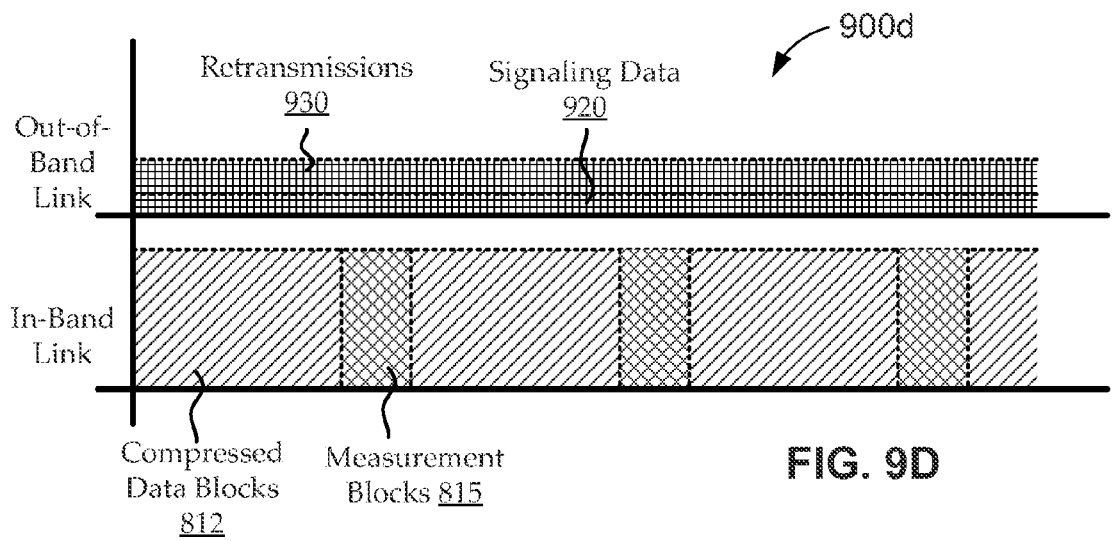
FIGS. 9D and 9E show simplified communication diagrams for data communications over a communications link in a compressed mode, where the OOB link is used for communication of combinations of supplemental data.
Figure 9E:
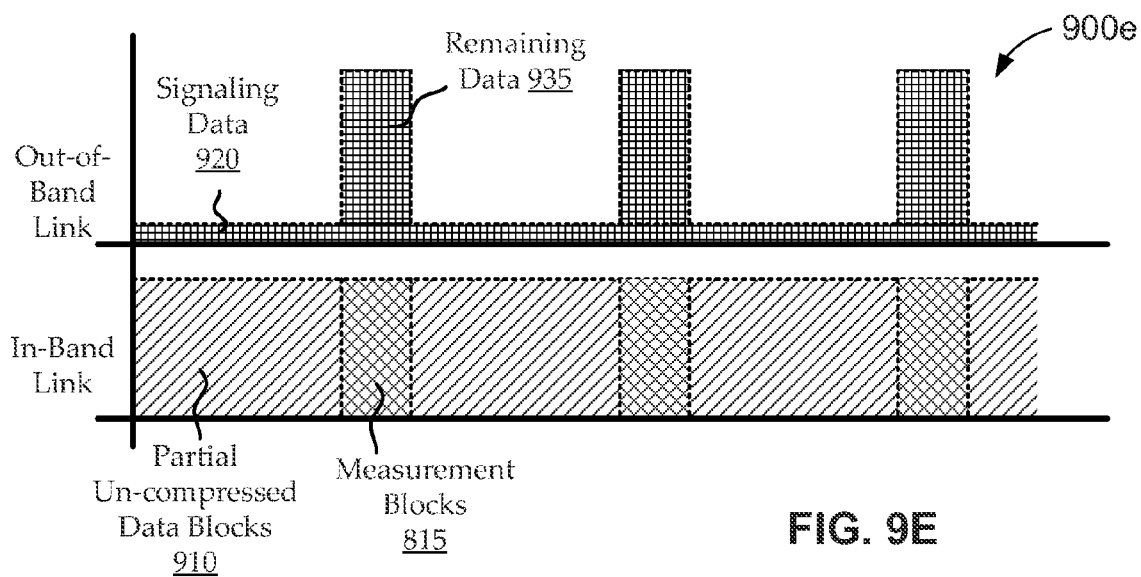

FIGS. 9D and 9E show simplified communication diagrams 900d and 900e for data communications over a communications link in a compressed mode, where the OOB link is used for communication of combinations of supplemental data. The communication diagram 900d of FIG. 9D may represent alternate embodiments of techniques, such as those described with reference to FIGS. 7B and 9A. The communication diagram 900e of FIG. 9E may represent alternate embodiments of techniques, such as those described with reference to FIGS. 7C and 9B.

According to the communication diagram 900d of FIG. 9D, data is communicated on the in-band (WWAN) link in compressed data blocks 812 with interspersed measurement blocks 815. The OOB link is used concurrently to communicate signaling data 920 and retransmissions and/or other types of data to compensate for any reduction in data quality resulting from the use of compressed data blocks 812. According to the communication diagram 900e of FIG. 9E, data is communicated on the in-band (WWAN) link in partial un-compressed data blocks 910 with interspersed measurement blocks 815. The OOB link is used concurrently to communicate signaling data 920 and "remaining" data 935 (i.e., data that would otherwise be communicated during those slots being used for the measurement blocks 815 in compressed mode).

It is worth noting that the diagrams 900 of FIGS. 9A-9E are illustrative only and are not intended to show all possible scenarios. For example, in FIG. 9A, retransmissions may be communicated periodically, at a variable data rate as needed, using multiple OOB links concurrently, etc. Similarly, remaining data 935 in FIG. 9B may be communicated in a way that takes more or less time than the measurement blocks 815 (e.g., at different times, as bursts, at different data rates, etc.). For example, mismatches between physical rates supported over the WWAN and OOB links may cause there to be more or less remaining data 935 than the compressed mode measurement gap durations. Accordingly, the "remaining data" may, in fact, not be an identical dataset to the dataset not otherwise transmitted during the compressed mode measurement blocks 815.

The signaling data 820 shown in FIGS. 9C-9E may similarly be communicated in a number of different ways not illustrated by the figures. For example, the signaling data 820 can be communicated in short bursts, at different data rates, over multiple OOB links concurrently or at different times, etc. Further, use of the OOB link to communicate the data may affect the amount and type of signaling data 820.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM, and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
   detecting a measurement trigger condition with user equipment while the user equipment is communicating with a femtocell over a wireless wide area network (WWAN) link on a first WWAN channel according to a first communications mode at a data rate in satisfaction of a rate target and at a data quality in satisfaction of a quality target; and
   switching the user equipment to communicate according to a second communications mode in response to detecting the measurement trigger, communicating according to the second communications mode comprising:
   interspersing measurement blocks with data frames, such that the user equipment communicates with the femtocell over the WWAN link on the first WWAN channel during the data frames and performs measurements on at least a second WWAN channel during the measurement blocks;
   compressing communications with the femtocell over the WWAN link on the first WWAN channel by reducing at least one of the data rate or the data quality; and
   communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

2. The method of claim 1, wherein:
   communicating according to the second communications mode further comprises generating signaling data configured to facilitate communications by the user equipment according to the second mode; and
   communicating the supplemental data between the user equipment and the OOB femto-proxy over the OOB link comprises communicating at least some of the signaling data over the OOB link.

3. The method of claim 1, wherein:
   the user equipment communicates data with the femtocell over the WWAN link on the first WWAN channel, the data having a payload portion and a redundancy portion configured to satisfy the quality target;
   compressing communications with the femtocell over the WWAN link on the first WWAN channel comprises reducing the data quality by reducing the redundancy portion of the data; and
   communicating the supplemental data between the user equipment and the OOB femto-proxy over the OOB link comprises communicating retransmissions over the OOB link to at least partially compensate for the reducing of the data quality.

4. The method of claim 3, wherein compressing communications with the femtocell over the WWAN link on the first WWAN channel comprises reducing the data quality by reducing the redundancy portion of the data without substantially increasing instantaneous transmit power associated with the WWAN link.

5. The method of claim 3, wherein:
   communicating according to the second communications mode further comprises generating signaling data configured to facilitate communications by the user equipment according to the second mode; and
   communicating the supplemental data between the user equipment and the OOB femto-proxy over the OOB link further comprises communicating at least some of the signaling data over the OOB link.

6. The method of claim 3, wherein:
   communicating according to the first communications mode comprises communicating data with the femtocell over the WWAN link on the first WWAN channel during the data frames, each data frame having a first duration; and
   communicating according to the second communications mode comprises communicating data with the femtocell over the WWAN link on the first WWAN channel during the data frames, each data frame having a second duration that is shorter than the first duration.

7. The method of claim 1, wherein:
   compressing communications with the femtocell over the WWAN link on the first WWAN channel comprises reducing the data rate by communicating data with the femtocell only during the data frames and without substantially changing the data quality, such that only a first portion of the data can be communicated over the WWAN link; and communicating the supplemental data between the user equipment and the OOB femto-proxy over the OOB link comprises communicating a remaining portion of the data over the OOB link to at least partially compensate for the reducing of the data rate.

8. The method of claim 7, wherein the remaining portion of the data is communicated over the OOB link only during the measurement blocks.

9. The method of claim 7, wherein:
communicating according to the second communications mode further comprises generating signaling data configured to facilitate communications by the user equipment according to the second mode; and
communicating the supplemental data between the user equipment and the OOB femto-proxy over the OOB link further comprises communicating at least some of the signaling data over the OOB link.

10. The method of claim 1, wherein the femtocell and the OOB femto-proxy are integrated with each other as part of a femto-proxy system.

11. The method of claim 1, wherein the second WWAN channel is an inter-frequency neighbor or an inter-RAT (radio access technology) neighbor of the first WWAN channel.

12. The method of claim 1, wherein the OOB link is a Bluetooth link.

13. User equipment comprising:
an in-band communications subsystem configured to communicatively couple with a femtocell over a wireless wide area network (WWAN) link on a first WWAN channel and to communicate with at least one macrocell over the WWAN link on a second WWAN channel;
an out-of-band (OOB) communications subsystem configured to communicatively couple with an OOB femto-proxy over an OOB link; and
a communications management subsystem, communicatively coupled with the in-band communications subsystem and the OOB communications subsystem, and configured to:
detect a measurement trigger condition while communicating with the femtocell over the WWAN link on the first WWAN channel according to a first communications mode at a data rate in satisfaction of a rate target and at a data quality in satisfaction of a quality target; and
direct the in-band communications subsystem and the OOB communications subsystem to communicate according to a second communications mode in response to detecting the measurement trigger, communicating according to the second communications mode comprising:
interspersing measurement blocks with data frames, such that communications with the femtocell over the WWAN link on the first WWAN channel occur during the data frames and measurements are performed on at least the second WWAN channel during the measurement blocks;
compressing communications with the femtocell over the WWAN link on the first WWAN channel by reducing at least one of the data rate or the data quality; and
communicating supplemental data with the OOB femto-proxy over the OOB link substantially concurrently with communicating with the femtocell over the WWAN link, such that communicating the supplemental data at least partially compensates for the reducing at least one of the data rate or the data quality.

14. The user equipment of claim 13, wherein the communications management subsystem is configured to direct the in-band communications subsystem and the OOB communications subsystem to communicate according to the second communications mode by:
receiving parameters of the second communications mode from the femtocell, such that communication according to the second communications mode comprises communication according to the parameters of the second communications mode.

15. The user equipment of claim 13, wherein the communications management subsystem is further configured to:
communicate according to the second communications mode further by generating signaling data configured to facilitate communications by the user equipment according to the second mode; and
communicate the supplemental data between the user equipment and the OOB femto-proxy over the OOB link by communicating at least some of the signaling data over the OOB link.

16. The user equipment of claim 13, wherein:
data communicated with the femtocell over the WWAN link on the first WWAN channel comprises a payload portion and a redundancy portion configured to satisfy the quality target; and
the communications management subsystem is further configured to:
compress communications with the femtocell over the WWAN link on the first WWAN channel by reducing the data quality by reducing the redundancy portion of the data; and
communicate the supplemental data with the OOB femto-proxy over the OOB link by communicating retransmissions over the OOB link to at least partially compensate for the reducing of the data quality.

17. The user equipment of claim 16, wherein the communications management subsystem is further configured to compress communications with the femtocell over the WWAN link on the first WWAN channel by reducing the redundancy portion of the data without substantially increasing instantaneous transmit power associated with the WWAN link.

18. The user equipment of claim 16, wherein the communications management subsystem is further configured to:
communicate according to the second communications mode further by generating signaling data configured to facilitate communications according to the second mode; and
communicate the supplemental data with the OOB femto-proxy over the OOB link further by communicating at least some of the signaling data over the OOB link.

19. The user equipment of claim 13, wherein the communications management subsystem is further configured to:
compress communications with the femtocell over the WWAN link on the first WWAN channel by reducing the data rate by communicating data with the femtocell only during the data frames and without substantially changing the data quality, such that only a first portion of the data can be communicated over the WWAN link; and
communicate the supplemental data with the OOB femto-proxy over the OOB link by communicating a remaining portion of the data over the OOB link to at least partially compensate for the reducing of the data rate.

20. The user equipment of claim 19, wherein the communications management subsystem is further configured to:
communicate according to the second communications mode further by generating signaling data configured to facilitate communications according to the second mode; and
communicate the supplemental data with the OOB femto-proxy over the OOB link further by communicating at least some of the signaling data over the OOB link.

21. A processor comprising:
an in-band communications controller configured to communicatively couple with a femtocell over a wireless wide area network (WWAN) link on a first WWAN channel and to communicate with at least one macrocell over the WWAN link on a second WWAN channel;
an out-of-band (OOB) communications controller configured to communicatively couple with an OOB femto-proxy over an OOB link; and
a communications management controller, communicatively coupled with the in-band communications subsystem and the OOB communications subsystem, and configured to:
detect a measurement trigger condition while communicating with the femtocell over the WWAN link on the first WWAN channel according to a first communications mode at a data rate in satisfaction of a rate target and at a data quality in satisfaction of a quality target; and
direct the in-band communications controller and the OOB communications controller to communicate according to a second communications mode in response to detecting the measurement trigger, communicating according to the second communications mode comprising:
interspersing measurement blocks with data frames, such that communications with the femtocell over the WWAN link on the first WWAN channel occur during the data frames and measurements are performed on at least the second WWAN channel during the measurement blocks;
compressing communications with the femtocell over the WWAN link on the first WWAN channel by reducing at least one of the data rate or the data quality; and
communicating supplemental data with the OOB femto-proxy over the OOB link substantially concurrently with communicating with the femtocell over the WWAN link, such that communicating the supplemental data at least partially compensates for the reducing at least one of the data rate or the data quality.

22. The processor of claim 21, wherein the communications management controller is further configured to:
communicate according to the second communications mode further by generating signaling data configured to facilitate communications by the user equipment according to the second mode; and
communicate the supplemental data between the user equipment and the OOB femto-proxy over the OOB link by communicating at least some of the signaling data over the OOB link.

23. The processor of claim 21, wherein:
data communicated with the femtocell over the WWAN link on the first WWAN channel comprises a payload portion and a redundancy portion configured to satisfy the quality target; and
the communications management controller is further configured to:
compress communications with the femtocell over the WWAN link on the first WWAN channel by reducing the data quality by reducing the redundancy portion of the data; and
communicate the supplemental data with the OOB femto-proxy over the OOB link by communicating retransmissions over the OOB link to at least partially compensate for the reducing of the data quality.

24. The processor of claim 21, wherein the communications management controller is further configured to compress communications with the femtocell over the WWAN link on the first WWAN channel by reducing the redundancy portion of the data without substantially increasing instantaneous transmit power associated with the WWAN link.

25. The processor of claim 21, wherein the communications management controller is further configured to:
communicate according to the second communications mode further by generating signaling data configured to facilitate communications according to the second mode; and
communicate the supplemental data with the OOB femto-proxy over the OOB link further by communicating at least some of the signaling data over the OOB link.

26. The processor of claim 21, wherein the communications management controller is further configured to:
compress communications with the femtocell over the WWAN link on the first WWAN channel by reducing the data rate by communicating data with the femtocell only during the data frames and without substantially changing the data quality, such that only a first portion of the data can be communicated over the WWAN link; and
communicate the supplemental data with the OOB femto-proxy over the OOB link by communicating a remaining portion of the data over the OOB link to at least partially compensate for the reducing of the data rate.

27. The processor of claim 26, wherein the communications management controller is further configured to:
communicate according to the second communications mode further by generating signaling data configured to facilitate communications according to the second mode; and
communicate the supplemental data with the OOB femto-proxy over the OOB link further by communicating at least some of the signaling data over the OOB link.

28. A computer program product residing on a non-transitory processor-readable medium and comprising processor-readable instructions, which, when executed, cause a processor to perform steps comprising:
detecting a measurement trigger condition with user equipment while the user equipment is communicating with a femtocell over a wireless wide area network (WWAN) link on a first WWAN channel according to a first communications mode at a data rate in satisfaction of a rate target and at a data quality in satisfaction of a quality target; and
switching the user equipment to communicate according to a second communications mode in response to detecting the measurement trigger, communicating according to the second communications mode comprising:
interspersing measurement blocks with data frames, such that the user equipment communicates with the femtocell over the WWAN link on the first WWAN channel during the data frames and performs measurements on at least a second WWAN channel during the measurement blocks;

compressing communications with the femtocell over the WWAN link on the first WWAN channel by reducing at least one of the data rate or the data quality; and
communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

29. The computer program product of claim 28, the processor-readable instructions, when executed, causing the processor to perform steps further comprising:
communicating according to the second communications mode further comprises generating signaling data configured to facilitate communications by the user equipment according to the second mode; and
communicating the supplemental data between the user equipment and the OOB femto-proxy over the OOB link comprises communicating at least some of the signaling data over the OOB link.

30. The computer program product of claim 28, the processor-readable instructions, when executed, causing the processor to perform steps further comprising:
the user equipment communicates data with the femtocell over the WWAN link on the first WWAN channel, the data having a payload portion and a redundancy portion configured to satisfy the quality target;
compressing communications with the femtocell over the WWAN link on the first WWAN channel comprises reducing the data quality by reducing the redundancy portion of the data; and
communicating the supplemental data between the user equipment and the OOB femto-proxy over the OOB link comprises communicating retransmissions over the OOB link to at least partially compensate for the reducing of the data quality.

31. The computer program product of claim 30, wherein compressing communications with the femtocell over the WWAN link on the first WWAN channel comprises reducing the data quality by reducing the redundancy portion of the data without substantially increasing instantaneous transmit power associated with the WWAN link.

32. The computer program product of claim 30, wherein:
communicating according to the second communications mode further comprises generating signaling data configured to facilitate communications by the user equipment according to the second mode; and
communicating the supplemental data between the user equipment and the OOB femto-proxy over the OOB link further comprises communicating at least some of the signaling data over the OOB link.

33. The computer program product of claim 28, the processor-readable instructions, when executed, causing the processor to perform steps further comprising:
compressing communications with the femtocell over the WWAN link on the first WWAN channel comprises reducing the data rate by communicating data with the femtocell only during the data frames and without substantially changing the data quality, such that only a first portion of the data can be communicated over the WWAN link; and
communicating the supplemental data between the user equipment and the OOB femto-proxy over the OOB link comprises communicating a remaining portion of the data over the OOB link to at least partially compensate for the reducing of the data rate.

34. The computer program product of claim 33, wherein:
communicating according to the second communications mode further comprises generating signaling data configured to facilitate communications by the user equipment according to the second mode; and
communicating the supplemental data between the user equipment and the OOB femto-proxy over the OOB link further comprises communicating at least some of the signaling data over the OOB link.

35. A system comprising:
means for communicating with a femtocell over a wireless wide area network (WWAN) link on a first WWAN channel according to a first communications mode at a data rate in satisfaction of a rate target and at a data quality in satisfaction of a quality target;
means for detecting a measurement trigger condition while the means for communicating is communicating according to the first communications mode; and
means for directing the means for communicating to communicate according to a second communications mode in response to detecting the measurement trigger, the means for communicating configured to communicate according to the second communications mode by:
interspersing measurement blocks with data frames, such that the user equipment communicates with the femtocell over the WWAN link on the first WWAN channel during the data frames and performs measurements on at least a second WWAN channel during the measurement blocks;
compressing communications with the femtocell over the WWAN link on the first WWAN channel by reducing at least one of the data rate or the data quality; and
communicating supplemental data with an out-of-band (OOB) femto-proxy over an OOB link substantially concurrently with communicating with the femtocell over the WWAN link, such that communicating the supplemental data at least partially compensates for the reducing at least one of the data rate or the data quality.

36. The system of claim 35, wherein:
communicating according to the second communications mode further comprises generating signaling data configured to facilitate communications by the user equipment according to the second mode; and
communicating the supplemental data between the user equipment and the OOB femto-proxy over the OOB link comprises communicating at least some of the signaling data over the OOB link.

37. The system of claim 35, wherein:
the means for communicating communicates data with the femtocell over the WWAN link on the first WWAN channel, the data having a payload portion and a redundancy portion configured to satisfy the quality target;
compressing communications with the femtocell over the WWAN link on the first WWAN channel comprises reducing the data quality by reducing the redundancy portion of the data; and
communicating the supplemental data between the means for communicating and the OOB femto-proxy over the OOB link comprises communicating retransmissions over the OOB link to at least partially compensate for the reducing of the data quality.

38. The system of claim 37, wherein compressing communications with the femtocell over the WWAN link on the first WWAN channel comprises reducing the data quality by reducing the redundancy portion of the data without substantially increasing instantaneous transmit power associated with the WWAN link.

39. The system of claim 37, wherein:
communicating according to the second communications mode further comprises generating signaling data configured to facilitate communications according to the second mode; and
communicating the supplemental data with the OOB femto-proxy over the OOB link further comprises communicating at least some of the signaling data over the OOB link.

40. The system of claim 35, wherein:
compressing communications with the femtocell over the WWAN link on the first WWAN channel comprises reducing the data rate by communicating data with the femtocell only during the data frames and without substantially changing the data quality, such that only a first portion of the data can be communicated over the WWAN link; and
communicating the supplemental data with the OOB femto-proxy over the OOB link comprises communicating a remaining portion of the data over the OOB link to at least partially compensate for the reducing of the data rate.

41. The system of claim 40, wherein:
communicating according to the second communications mode further comprises generating signaling data configured to facilitate communications according to the second mode; and
communicating the supplemental data with the OOB femto-proxy over the OOB link further comprises communicating at least some of the signaling data over the OOB link.

42. A femto-proxy system comprising:
a femtocell, configured to provide macro network access to a plurality of user equipment authorized to attach to the femtocell according to an access control list over a wireless wide area network (WWAN) link on a first WWAN channel;
an out-of-band (OOB) communications subsystem, integrated with the femtocell and configured to communicatively couple with the plurality of user equipment over an OOB link; and
a communications management subsystem, communicatively coupled with the femtocell and the OOB communications subsystem, and configured to:
detect a measurement trigger condition for one of the user equipment that is in communication with the femtocell over the WWAN link on the first WWAN channel according to a first communications mode at a data rate in satisfaction of a rate target and at a data quality in satisfaction of a quality target; and
direct the one of the user equipment to communicate according to a second communications mode in response to detecting the measurement trigger, communicating according to the second communications mode comprising:
interspersing measurement blocks with data frames, such that communications with the femtocell over the WWAN link on the first WWAN channel occur during the data frames and measurements are performed on at least the second WWAN channel during the measurement blocks;
compressing communications with the femtocell over the WWAN link on the first WWAN channel by reducing at least one of the data rate or the data quality; and
communicating supplemental data with the OOB communications subsystem over the OOB link substantially concurrently with communicating with the femtocell over the WWAN link, such that communicating the supplemental data at least partially compensates for the reducing at least one of the data rate or the data quality.

43. The femto-proxy system of claim 42, wherein the communications management subsystem is further configured to direct the one of the user equipment to communicate according to the second communications mode by:
generating signaling data configured to facilitate communications by the one of the user equipment according to the second mode,
wherein communicating the supplemental data between the user equipment and the OOB communications subsystem over the OOB link comprises communicating at least some of the signaling data over the OOB link.

44. The femto-proxy system of claim 42, wherein:
data communicated with the femtocell over the WWAN link on the first WWAN channel comprises a payload portion and a redundancy portion configured to satisfy the quality target; and
the communications management subsystem is further configured to direct the one of the user equipment to communicate according to the second communications mode by:
compressing communications with the femtocell over the WWAN link on the first WWAN channel by reducing the data quality by reducing the redundancy portion of the data without substantially increasing instantaneous transmit power associated with the WWAN link; and
communicating the supplemental data with the OOB communications subsystem over the OOB link by communicating retransmissions over the OOB link to at least partially compensate for the reducing of the data quality.

45. The femto-proxy system of claim 44, wherein the communications management subsystem is further configured to direct the one of the user equipment to communicate according to the second communications mode by:
generating signaling data configured to facilitate communications according to the second mode; and
communicating the supplemental data with the OOB communications subsystem over the OOB link further by communicating at least some of the signaling data over the OOB link.

46. The femto-proxy system of claim 42, wherein the communications management subsystem is further configured to direct the one of the user equipment to communicate according to the second communications mode by:
compressing communications with the femtocell over the WWAN link on the first WWAN channel by reducing the data rate by communicating data with the femtocell only during the data frames and without substantially changing the data quality, such that only a first portion of the data can be communicated over the WWAN link; and
communicating the supplemental data with the OOB communications subsystem over the OOB link by communicating a remaining portion of the data over the OOB link to at least partially compensate for the reducing of the data rate.

47. A processor comprising:
a femtocell controller, configured to direct a femtocell to provide macro network access to a plurality of user equipment authorized to attach to the femtocell according to an access control list over a wireless wide area network (WWAN) link on a first WWAN channel;
an out-of-band (OOB) communications controller, configured to direct an OOB radio integrated with the femtocell to communicatively couple with the plurality of user equipment over an OOB link; and
a communications management controller, communicatively coupled with the femtocell controller and the OOB communications controller, and configured to:
 detect a measurement trigger condition for one of the user equipment that is in communication with the femtocell over the WWAN link on the first WWAN channel according to a first communications mode at a data rate in satisfaction of a rate target and at a data quality in satisfaction of a quality target; and
 direct the one of the user equipment to communicate according to a second communications mode in response to detecting the measurement trigger, communicating according to the second communications mode comprising:
  interspersing measurement blocks with data frames, such that communications with the femtocell over the WWAN link on the first WWAN channel occur during the data frames and measurements are performed on at least the second WWAN channel during the measurement blocks;
  compressing communications with the femtocell over the WWAN link on the first WWAN channel by reducing at least one of the data rate or the data quality; and
  communicating supplemental data with the OOB radio over the OOB link substantially concurrently with communicating with the femtocell over the WWAN link, such that communicating the supplemental data at least partially compensates for the reducing at least one of the data rate or the data quality.

48. A computer program product residing on a non-transitory processor-readable medium and comprising processor-readable instructions, which, when executed, cause a processor to perform steps comprising:
 detecting a measurement trigger condition corresponding to a user equipment while the user equipment is communicating with a femtocell over a wireless wide area network (WWAN) link on a first WWAN channel according to a first communications mode at a data rate in satisfaction of a rate target and at a data quality in satisfaction of a quality target; and
 directing the user equipment to communicate according to a second communications mode in response to detecting the measurement trigger, communicating according to the second communications mode comprising:
  interspersing measurement blocks with data frames, such that the user equipment communicates with the femtocell over the WWAN link on the first WWAN channel during the data frames and performs measurements on at least a second WWAN channel during the measurement blocks;
  compressing communications with the femtocell over the WWAN link on the first WWAN channel by reducing at least one of the data rate or the data quality; and
  communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

49. A system comprising:
means for detecting a measurement trigger condition corresponding to a user equipment while the user equipment is communicating with a femtocell over a wireless wide area network (WWAN) link on a first WWAN channel according to a first communications mode at a data rate in satisfaction of a rate target and at a data quality in satisfaction of a quality target; and
means for directing the user equipment to communicate according to a second communications mode in response to detecting the measurement trigger, communicating according to the second communications mode comprising:
 interspersing measurement blocks with data frames, such that the user equipment communicates with the femtocell over the WWAN link on the first WWAN channel during the data frames and performs measurements on at least a second WWAN channel during the measurement blocks;
 compressing communications with the femtocell over the WWAN link on the first WWAN channel by reducing at least one of the data rate or the data quality; and
 communicating supplemental data between the user equipment and an out-of-band (OOB) femto-proxy over an OOB link substantially concurrently with communicating with the femtocell over the WWAN link, such that communicating the supplemental data at least partially compensates for the reducing at least one of the data rate or the data quality.

* * * * *